US011768707B2

(12) United States Patent
Parmar et al.

(10) Patent No.: US 11,768,707 B2
(45) Date of Patent: Sep. 26, 2023

(54) WORKFLOW SELECTION

(71) Applicant: Box, Inc., Redwood City, CA (US)

(72) Inventors: Varun Parmar, San Francisco, CA (US); Karthik Shanmugasundaram, San Jose, CA (US); Ivan Sabinin, Castro Valley, CA (US)

(73) Assignee: Box, Inc., Redwood City, CA (US)

( * ) Notice: Subject to any disclaimer, the term of this patent is extended or adjusted under 35 U.S.C. 154(b) by 284 days.

(21) Appl. No.: 16/553,161

(22) Filed: Aug. 27, 2019

(65) Prior Publication Data
US 2020/0065152 A1 Feb. 27, 2020

Related U.S. Application Data

(60) Provisional application No. 62/723,435, filed on Aug. 27, 2018.

(51) Int. Cl.
*G06F 9/50* (2006.01)
*G06F 16/28* (2019.01)
(Continued)

(52) U.S. Cl.
CPC .......... *G06F 9/5027* (2013.01); *G06F 16/254* (2019.01); *G06F 16/288* (2019.01); *H04L 67/10* (2013.01); *H04L 67/53* (2022.05)

(58) Field of Classification Search
CPC .... G06F 9/5027; G06F 16/288; G06F 16/254; H04L 67/10; H04L 67/20
See application file for complete search history.

(56) References Cited

U.S. PATENT DOCUMENTS 9,148,425 B2 9/2015 Rowe et al.
10,038,731 B2 7/2018 Pearl et al.
(Continued)

FOREIGN PATENT DOCUMENTS

CN 108256788 7/2018

OTHER PUBLICATIONS

Non-Final Office Action dated Apr. 20, 2021 for related U.S. Appl. No. 16/553,144.
(Continued)

*Primary Examiner* — Beau D Spratt
(74) *Attorney, Agent, or Firm* — Vista IP Law Group, LLP

(57) ABSTRACT

Methods, systems and computer program products for content management systems. In a computing environment having multiple interconnected computer systems, one or more network communication links between a first computer system that hosts a first application and a second computer system that hosts one or more second applications are established. The first computer system hosts a plurality of shared content objects that can be operated over by any second applications that are interfaced with the first application. Particular interaction events over a shared content object take place at the second applications and/or at the interfaces between the first and second applications. Such particular interaction events are recorded as they occur, after which, based on event attributes associated with the particular interaction events, at least one workflow of the first application is selected. The selected workflow of the first application is executed to perform operations over the shared content object.

18 Claims, 12 Drawing Sheets

(51) Int. Cl.
  *G06F 16/25* (2019.01)
  *H04L 67/10* (2022.01)
  *H04L 67/53* (2022.01)

(56) References Cited

U.S. PATENT DOCUMENTS

| | | | |
|---|---|---|---|
| 10,176,435 | B1 | 1/2019 | Sarkar et al. |
| 10,331,416 | B2* | 6/2019 | Chaudhry .................. G06F 8/34 |
| 10,540,624 | B2* | 1/2020 | Hui .................. G06Q 10/06316 |
| 10,853,718 | B2* | 12/2020 | Gottin .................... G06F 9/5038 |
| 10,922,282 | B2 | 2/2021 | Jalagam et al. |
| 11,244,284 | B2* | 2/2022 | Milvaney ................ G06F 16/93 |
| 2004/0049481 | A1 | 3/2004 | Blevins |
| 2004/0260593 | A1 | 12/2004 | Abraham-Fuchs et al. |
| 2006/0074703 | A1 | 4/2006 | Bhandarkar et al. |
| 2007/0005388 | A1 | 1/2007 | Busch et al. |
| 2007/0157210 | A1 | 7/2007 | Inoue et al. |
| 2007/0203589 | A1 | 8/2007 | Flinn et al. |
| 2007/0265900 | A1 | 11/2007 | Moore et al. |
| 2008/0114791 | A1 | 5/2008 | Takatsu et al. |
| 2008/0183536 | A1 | 7/2008 | Hirabayashi |
| 2009/0172101 | A1 | 7/2009 | Arthursson |
| 2009/0249290 | A1 | 10/2009 | Jenkins et al. |
| 2011/0004583 | A1 | 1/2011 | Honda |
| 2012/0239739 | A1 | 9/2012 | Manglik et al. |
| 2013/0275475 | A1 | 10/2013 | Ahlborn |
| 2015/0067028 | A1 | 3/2015 | Kumar et al. |
| 2015/0082271 | A1 | 3/2015 | Damonte et al. |
| 2015/0088924 | A1 | 3/2015 | Abadi et al. |
| 2015/0149535 | A1* | 5/2015 | Howard .................. H04L 67/34 709/203 |
| 2017/0048285 | A1* | 2/2017 | Pearl ....................... G06F 16/11 |
| 2017/0068915 | A1 | 3/2017 | Nair |
| 2017/0168765 | A1* | 6/2017 | Fan ....................... G06F 3/1287 |
| 2017/0264567 | A1* | 9/2017 | Shetty ................... H04L 47/803 |
| 2017/0316363 | A1* | 11/2017 | Siciliano .......... G06Q 10/06316 |
| 2019/0026663 | A1* | 1/2019 | Homeyer ......... G06Q 10/06316 |
| 2019/0332695 | A1 | 10/2019 | Bensberg et al. |
| 2020/0050330 | A1* | 2/2020 | Schilling ................ G06N 20/00 |
| 2020/0065152 | A1 | 2/2020 | Parmar et al. |
| 2020/0065313 | A1 | 2/2020 | Patel et al. |
| 2020/0301674 | A1 | 9/2020 | Swope et al. |
| 2020/0380432 | A1 | 12/2020 | Wang et al. |
| 2020/0389543 | A1 | 12/2020 | Swope et al. |
| 2021/0004273 | A1 | 1/2021 | You et al. |
| 2022/0083679 | A1 | 3/2022 | Hiller et al. |

OTHER PUBLICATIONS

Bellini, et al. A Workflow Model and Architecture for Content and Metadata Management Based on Grid Computing. ECLAP 2013, pp. 118-127. (Year: 2013).
Belhajjame et al. Metadata Management in the Taverna Workflow System. IEEE International Symposium on Cluster Computing and the Grid, 2008, pp. 651-656. (Year: 2008).
Final Office Action dated Aug. 31, 2021 for related U.S. Appl. No. 16/553,144.
Non-Final Office Action dated Apr. 15, 2021 for related U.S. Appl. No. 16/726,093.
Glatard, T. et al., "Software architectures to integrate workflow engines in science gateways", Future Generation Computer Systems, vol. 75, (Oct. 2017).
Duranova, E. "Data Object Classes", DNAnexus, (last edited on Oct. 4, 2018).
"Informatica® Test Data Management 10.2.1", User Guide, (May 2018).
Zalcman, A. "Developer Tutorials/Workflow Build Process", DNAnexus, (last edited on Oct. 4, 2018).
Salesforce, "Metadata API Developer Guide", Version 46.0, Summer '19, (Last updated: May 22, 2019).
IBM Cúram Social Program Management, Cúram Workflow Reference Guide, Version 6.0.4.
Vardigan, Mary, et al. "Creating Rich, Structured Metadata: Lessons Learned in the Metadata Portal Project." IASSIST Quarterly 38.3 (2015): 15-15.
Final Office Action dated Oct. 26, 2021 for related U.S. Appl. No. 16/726,093.
Final Office Action for U.S. Appl. No. 16/726,093 dated Oct. 26, 2021.
Non-Final Office Action for U.S. Appl. No. 16/726,093 dated Apr. 15, 2021.
Non-Final Office Action for U.S. Appl. No. 16/948,829 dated Sep. 15, 2021.
Geisriegler, "Actor Based Business Process Modeling and Execution: a Reference Implementation Based on Ontology Models and Microservices," 2017 43rd Euromicro Conference on Software Engineering and Advanced Applications (S EAA), pp. 359-362 (Year: 2017).
Koschmider, "Recommendation-based editor for business process modeling," 2011, Data & Knowledge Engineering, vol. 70, pp. 483-503 (Year: 2011).
"SharePoint 2013 Workflow—Dynamic Values", AndrewConnell, dated Jul. 17, 2012, URL: https://www.andrewconnell.com/blog/SP2013-Workflow-Dynamic-Values/.
"Workflow Variable Datatype Conversion", Informatica, dated Apr. 15, 2019, URL: https://docs.informatica.com/data-integration/data-services/10-2/developer-workflow-guide/workflow-variables/workflow-variable-datatype-conversion.html.
"Creating Dynamic Variable Types", UIPath Forum, dated Aug. 2019, URL: https://forum.uipath.com/t/creating-dynamic-variable-types/141077.
"Developing Web Views for VMware vCenter Orchestrator", vRealize Orchestrator 5.5, vmware, copyright 2017.
"VMware vCenter Orchestrator 5.5 Release Notes", Vmware, dated Jun. 26, 2017.
"Developing with Vmware vCenter Orchestrator," vRealize Orchestrator 5.5.1, copyright 2014.
"Developing a Web Services Client for VMware vCenter Orchestrator," vRealize Orchestrator 5.5.1, copyright 2014.
"VMware vCenter Orchestrator 5.5.1 Release Notes", vmware, dated Jun. 23, 2017.
"Using the Vmware vCenter Orchestrator Client," vRealize Orchestrator 5.5.1, Copyright 2014.
"Installing and Configuring Vmware vCenter Orchestrator," vRealize Orchestrator 5.5.2, Copyright 2014.
"VMware vCenter Orchestrator 5.5.2 Release Notes," vmware, dated Jun. 16, 2017.
"Using VMware vCenter Orchestrator Plug-Ins," vRealize Orchestrator 5.5.2, Copyright 2014.
"VMware vCenter Orchestrator 5.5.3 Release Notes," vmware, dated Jun. 23, 2017.
"VMware vCenter Orchestrator 5.5.2.1 Release Notes," vmware, dated Jun. 16, 2017.
"ProcessMaker Advanced Workflow for DocuSign," DocuSign, date obtained via Google as 2018, URL: https://partners.docusign.com/s/partner-solution/aNR1W000000001l/processmaker-advanced-workflow-for-docusign-esignature.
"DocuSign Electronic Signature Workflow," ProcessMaker, date obtained via Google as Dec. 5, 2016, URL: https://www.processmaker.com/landing/processmaker-docusign/.
Glatard, T., et al. "Software architectures to integrate workflow engines in science gateways," Future Generation Computer Systems vol. 75, Oct. 2017, pp. 239-255.
"Data Object Classes," copyright 2013, DNAnexus, Inc.
"Metadata API Developer Guide," SalesForce, Version 46.0, dated 2019.
"Cúram Workflow Reference Guide," Version 6.0.4, Copyright 2011, Cúram Software Limited.
"Developer Tutorials/Workflow Build Process," copyright 2013, DNAnexus, Inc.
"IBM Case Manager target object store extensions," IBM Corporation, Copyright 2016.
Vardigan, M., et al., "Creating Rich, Structured Metadata: Lessons Learned in the Metadata Portal Project," IASSIST Quarterly, dated 2014.

(56) References Cited

OTHER PUBLICATIONS

"User Guide," Informatica® Test Data Management 10.2.1, dated May 2018.
"Do more with Dropbox using your favorite tools," Dropbox, date found via Internet Archive as Mar. 8, 2021, URL: https://www.dropbox.com/features/extensions.
"Build better campaigns with Dropbox for Salesforce Marketing Cloud," Dropbox Team, dated Jun. 17, 2019, URL: https://blog.dropbox.com/topics/product-tips/dropbox-marketing-cloud.
English Translation of CN-108256788-A, dated Sep. 28, 2021 (original reference published on Jul. 6, 2018).
Non-Final Office Action for U.S. Appl. No. 16/726,081 dated Oct. 4, 2021.
Final Office Action for U.S. Appl. No. 16/948,829 dated Mar. 1, 2022.
Jensen et al. Using Characteristics of Computational Science Schemas for Workflow Metadata Management. IEEE Congress on Services 2008—Part I, pp. 445-452. (Year: 2008).
Non-Final Office Action for U.S. Appl. No. 16/553,144 dated Mar. 10, 2022.
Notice of Allowance for U.S. Appl. No. 16/726,093 dated Feb. 25, 2022.
Notice of Allowance for U.S. Appl. No. 16/726,093 dated Apr. 14, 2022.
Final Office Action for U.S. Appl. No. 16/726,081 dated Apr. 14, 2022.
Final Office Action For U.S. Appl. No. 16/553,144 dated Aug. 5, 2022.
Non-Final Office Action for U.S. Appl. No. 16/726,081 dated Aug. 5, 2022.
Notice of Allowance dated Dec. 30, 2022 for U.S. Appl. No. 16/726,093.
Notice of Allowance dated Sep. 21, 2022 for U.S. Appl. No. 17/447,562.
Notice of Allowance for U.S. Appl. No. 16/726,093 dated Aug. 31, 2022.
Notice of Allowance for U.S. Appl. No. 16/726,081 dated Jan. 26, 2023.
Notice of Allowance dated Feb. 15, 2023 for U.S. Appl. No. 16/726,093.
Non-Final Office Action dated Feb. 17, 2023 for U.S. Appl. No. 16/553,144.
Non-Final Office Action dated Feb. 28, 2023 for U.S. Appl. No. 16/948,829.
Final Office Action dated Jul. 13, 2023 for U.S. Appl. No. 16/948,829.
What is Dubin Core (DC)? https://techtarget.com/whatis/definition/Dublin-Core, 2008, pp. 1-7. (Year: 2008).
Final Office Action dated Aug. 1, 2023 for related U.S. Appl. No. 16/553,144.

\* cited by examiner

WORKFLOW SELECTION

CROSS-REFERENCE TO RELATED APPLICATION(S)

The present application claims the benefit of priority to U.S. Patent Application Ser. No. 62/723,435 titled "COLLABORATION SYSTEMS", filed on Aug. 27, 2018, which is hereby incorporated by reference in its entirety.

FIELD

This disclosure relates to shared content management systems, and more particularly to techniques for workflow selection.

BACKGROUND

Cloud-based content management services and systems have impacted the way personal and corporate electronic information objects (e.g., files, images, videos, etc.) are stored, and has also impacted the way such personal and corporate content objects are shared and managed. Content management systems provide an ability to securely share large volumes of content objects among trusted collaborators on a variety of user devices such as mobile phones, tablets, laptop computers, desktop computers, and/or other devices.

In some systems, sharing and collaboration activities include various sequences of operations that are performed over the content objects. Such sequences of operations are often organized into workflows. Workflows specify characteristics (e.g., operands and operators) of operations that are to be performed in an ordered sequence or "flow" over the content objects. Operations of a workflow often involve interactions with one or more content objects performed by one user, or performed by multiple users (e.g., collaborators), and/or even autonomously by one or more computing entities (e.g., processes, agents, applications, etc.). As an example, a document approval workflow might facilitate the approval of a published (e.g., uploaded) document by automatically forwarding the document in a sequence to a set of approvers who interact (e.g., view, edit, approve, etc.) with the document to carry out the workflow. In this and other computer-facilitated workflows, the workflows are initiated and/or traversed based at least in part on then-current conditions associated with the workflows, including conditions pertaining to previously performed interactions, the subject content objects, and/or other conditions.

In modern computing environments, interactions with content objects managed by a content management system are sometimes performed using one or more third-party applications. A third-party application may be selected from the hundreds of third-party applications available in a computing environment for a variety of reasons such as the familiarity and/or proficiency of users with the application; the popularity and/or functionality of the application as pertains to a particular content object type and/or a particular set of interactions (e.g., operations) over that content object type; and/or other reasons. As such, workflows over a particular content object might be performed entirely by a third-party application, or entirely at the content management system, or using some combination of one or more third-party applications and the content management system.

Unfortunately, with the boundless increase in the number of users, content objects, third-party applications, and workflows in today's computing environments, the challenges to selecting a particular workflow to execute over a particular content object are also increasing boundlessly. Consider the case of a user from a large enterprise who interacts with a third-party application to create a sales document to be managed at a content management system. Over time, several different workflows might be executed over the sales document. The specific determination of which different workflows might need to be executed depends on various conditions and/or attributes. Such conditions and/or attributes might pertain to "who" (e.g., by username, or by role, etc.) created the document, and/or such conditions or attributes might pertain to "what" (e.g., based on deal size, based on client name, etc.) content is in the document, and/or such conditions or attributes might pertain to "when" some action was taken over the document.

Some approaches might merely issue an alert to indicate some event (e.g., creation of the document) had occurred, and then rely on a one or more users to analyze the foregoing attributes to select and initiate an appropriate workflow. For example, a sales administrator might review the sales document and initiate an approval workflow. Moreover, those one or more users may be required to interact with the selected workflow to facilitate traversal and completion of the workflow. In the foregoing example, various approvers might be assigned to interact with (e.g., view, edit, etc.) the sales document to complete the approval workflow. In large enterprises, such human involvement in workflow selection and execution can be a burden on the users and the computing resources of the enterprises. What is needed is a way to eliminate or minimize the human interaction required to select and execute workflows performed over content objects.

SUMMARY

The present disclosure describes techniques used in systems, methods, and in computer program products for workflow selection, which techniques advance the relevant technologies to address technological issues with legacy approaches. More specifically, the present disclosure describes techniques used in systems, methods, and in computer program products for automatically selecting workflows to execute over content objects. Certain embodiments are directed to technological solutions for analyzing the attributes associated with interactions with content objects to automatically select workflows to execute over the content objects.

The disclosed embodiments modify and improve over legacy approaches. In particular, the herein-disclosed techniques provide technical solutions that eliminate the need for human interaction when initiating execution of workflows over content objects. Such technical solutions involve specific implementations (i.e., data organization, data communication paths, module-to-module interrelationships, etc.) that relate to the software arts for improving how a computer functions in the context of a collaboration system.

The ordered combination of steps of the embodiments serve in the context of practical applications that perform steps for analyzing the attributes associated with interactions with content objects to automatically select workflows to execute over the content objects. These techniques for analyzing the attributes associated with interactions with content objects to automatically select workflows to execute over the content objects overcome long standing yet heretofore unsolved technological problems associated with reducing or eliminating the need for human interaction to execute workflows over shared content objects.

Many of the herein-disclosed embodiments for analyzing the attributes associated with interactions with content objects to automatically select workflows to execute over the content objects are technological solutions pertaining to technological problems that arise in the hardware and software arts that underlie collaboration systems. Aspects of the present disclosure achieve performance and other improvements in peripheral technical fields including (but not limited to) distributed storage systems and semantic extraction and content classification.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
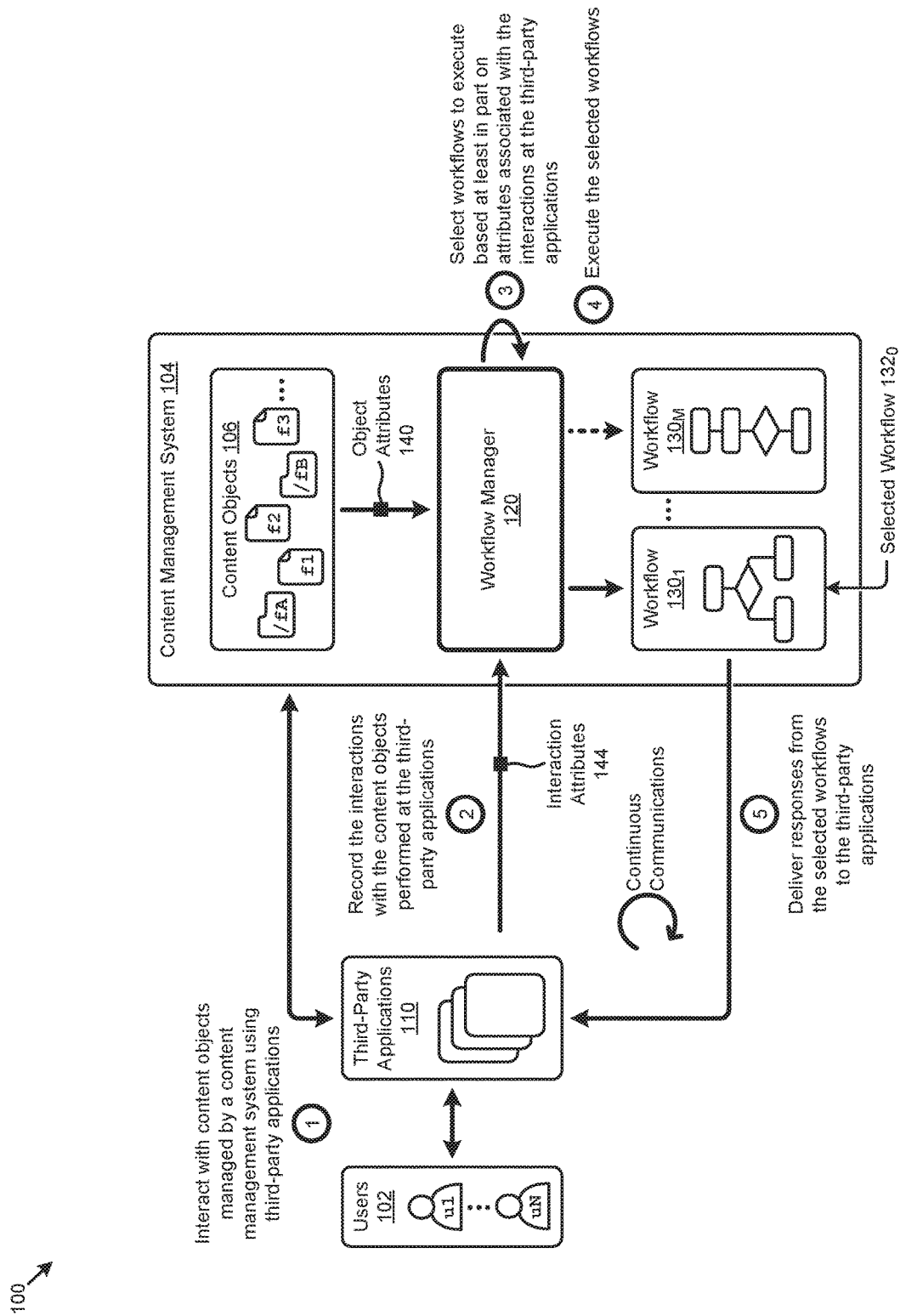
FIG. 1 illustrates a computing environment in which embodiments of the present disclosure can be implemented.

Aspects of the present disclosure solve problems associated with eliminating the need for human interaction to execute workflows over content objects. These problems are unique to, and may have been created by, various computer-implemented methods that execute workflows over content objects in the context of collaboration systems. Some embodiments are directed to computer-aided approaches for analyzing the attributes associated with interactions with content objects to automatically select workflows to execute over content objects. The accompanying figures and discussions herein present example environments, systems, methods, and computer program products for automatically selecting workflows to execute over content objects.

Overview

Disclosed herein are techniques for analyzing the attributes associated with interactions with content objects so as to automatically select workflows to execute over the content objects. In certain embodiments, the techniques are implemented in a computing environment comprising a content management system that facilitates interactions over a plurality of users and a plurality of content objects managed by the content management system. In exemplary embodiments, the content management system provides one or more native applications (e.g., a browser portal, a mobile application, etc.) that are accessed by users to facilitate at least some interactions (e.g., authoring, editing, viewing, etc.) with the content objects. The users may also interact with the content objects using third-party applications that are available in the computing environment. As used herein, such third-party applications are applications that are not provided and/or maintained by the content management system but rather are applications that are provided and/or maintained by third parties and are merely integrated with the content management system so as to facilitate certain interactions over at least some of the content objects managed at the system.

Example third-party applications are external applications that are hosted on different computing infrastructure than the computing infrastructure of the content management system. In many cases, the computing infrastructure for hosting the content management system is located in a first city, whereas the computing infrastructure for hosting the third-party applications is located in a second city. In many cases, the second city is geographically distant from the first city. The first infrastructure is interconnected to the second infrastructure by the Internet and/or by leased telecommunications lines.

In some embodiments, third-party applications that are hosted at the second infrastructure communicate with the content management system through use of web services, where at least some of the web services are hosted at the first infrastructure, and where the web services are accessible via a uniform resource identifier (URI), possibly with a string of arguments that are received by the web services at the first infrastructure.

Irrespective of the particular technique or techniques used to communicate between the third-party applications and the content management system, when users interact with content objects using third-party applications, the corresponding interaction events are recorded at the content management system. The attributes associated with the interaction events are analyzed to select workflows to be executed over the content objects. Such attributes might pertain to a particular interaction event and/or might pertain to any content objects associated with the event. For example, the attributes might comprise an application identifier and timestamp associated with the interaction event and/or certain values or keywords extracted from a content object that is in some way associated with the event. The selected workflows are then executed at the content management system. In certain embodiments, responses associated with the selected workflows are delivered to third-party applications. In certain embodiments, responses associated with the selected workflows are processed by one or more computing agents before being issued to the third-party applications. In certain embodiments, one or more learning models are implemented to facilitate the selection and/or the execution of the workflows.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to analyzing the attributes associated with interactions with content objects to automatically select workflows to execute over the content objects. Specifically, the figure presents a logical depiction of how certain of the herein disclosed techniques can be used to select and execute workflows over content objects based on attributes associated with third-party applications. A representative set of high order operations are also presented to illustrate how the herein disclosed techniques might be applied in computing environment 100.

The logical depiction of FIG. 1 depicts a representative set of users 102 (e.g., user "u1", . . . , user "uN") who desire to interact with various instances of content objects 106 (e.g., folder "fA", folder "fB", file "f1", file "f2", and file "f3", etc.) managed at a content management system 104. Users 102 may be users of content management system 104 which facilitates interactions (e.g., authoring, editing, viewing, etc.) over content objects 106 for sharing, collaboration, and/or other purposes. In some cases, such interactions are organized into workflows. Interactions and/or workflows over a particular content object may be performed with some human interaction by one or more of users 102 and/or with autonomous interaction by one or more computing entities (e.g., processes, agents, applications, etc.). Content management system 104 may provide instances of a native application that can be accessed by respective ones of the users 102 to facilitate the interactions with content objects 106 and/or interactions with one another. As an example, the native application might be a browser portal or mobile application accessed by user "u1" to interact with file "f2" from content objects 106 and/or interact with other users from users 102.

As can be observed, a plurality of third-party applications 110 is also accessible by users 102 to interact with content objects 106 and/or other users. For example, a third-party application might be a web application, mobile application, or another type of application that is served by a third-party server and accessed by some or all of users 102 to perform such interactions. In this case, the applications are referred to as "third-party applications" that are provided (e.g., developed, delivered, served, maintained, etc.) by an entity (e.g., the owner of the third-party server) other than the entity providing the content management system 104. While such third-party applications are applications that are not provided and/or maintained by content management system 104, third-party applications 110 may still be integrated with content management system 104 to facilitate certain interactions with at least some of the types of content objects 106 managed at content management system 104. Such integration may include registration of third-party applications 110 with content management system 104, establishment of APIs to facilitate communication between the applications and system, and/or other integration capabilities. As discussed in more detail herein, certain application-specific information associated with the integration of the third-party applications facilitate at least some of the herein disclosed techniques.

In many cases, third-party applications 110 can improve the efficiency of the interactions performed over content objects 106. A particular third-party application may be selected from the hundreds of third-party applications available in computing environment 100 for a variety of reasons, such as the familiarity and/or proficiency of users with the application, the popularity and/or functionality of the application as pertains to a particular content object type and/or a particular interaction (e.g., operation) over that content object type, and/or for other reasons. As such, workflows over a particular content object might be performed entirely at one or more of the third-party applications 110, entirely at content management system 104, or at some combination of one or more of the third-party applications 110 and content management system 104.

However, with the increasing numbers of users 102, content objects 106, third-party applications 110, and workflows in computing environment 100, the challenges to selecting a particular workflow to execute over a particular content object are commensurately increasing. Specifically, the need for human involvement in workflow selection and execution in such increasingly complex computing environments can be a burden on the users and/or the computing resources in these environments.

The herein disclosed techniques address such challenges pertaining to the unwanted need for human interaction to select and execute workflows over content objects at least in part by analyzing the attributes associated with interactions with content objects 106 at third-party applications 110 to automatically select workflows to execute over the content objects.

In the embodiment of FIG. 1, the techniques are facilitated at least in part by a workflow manager 120 implemented at content management system 104. When users 102 interact with content objects 106 using any of the third-party applications 110 (operation 1), certain event attributes that correspond to the interaction events are recorded by workflow manager 120 at content management system 104 (operation 2). As shown, such event attributes may comprise certain instances of interaction attributes 144 (e.g., application identifier, user identifier, interaction type, event time, etc.) that describe the interaction event, and/or certain instances of object attributes 140 (e.g., object identifier, object type, content values, etc.) that describe the one or more content objects associated with the interaction event.

The foregoing event attributes are analyzed by workflow manager 120 to select workflows to execute over content objects 106 (operation 3). A particular workflow selection operation performed at workflow manager 120 is often automatically invoked (e.g., with no human involvement) in response to a certain interaction event that occurred at one of the third-party applications 110. In this case, the event attributes associated with the interaction event and/or event attributes associated with earlier occurring interaction events are analyzed to select a workflow. In the scenario of FIG. 1, a selected workflow $132_0$ is selected from a plurality of workflows (e.g., workflow $130_1, \ldots,$ workflow $130_M$). As described in more detail herein, selection of a workflow can be facilitated by a learning model.

When a workflow is selected, execution of the selected workflow is initiated by workflow manager 120 (operation 4). Initiation of the selected workflow is often performed automatically (e.g., with no human involvement) in response to selection of the workflow. In some cases, the entire selected workflow may be executed with no human involvement. As the operations and/or steps of the selected workflow are traversed, certain outcomes are produced. Examples of outcomes produced by workflows include content object changes (e.g., signatures added, etc.), content object metadata changes (e.g., permissions updated, etc.), workflow state changes, and/or other outcomes. Such workflow outcomes are communicated to third-party applications 110 by delivering responses from the workflows to the applications (operation 5). Responses from such a workflow can be delivered to the third-party application that invoked the selection and execution of the workflow and/or to other third-party applications.

In any case, the acts of receiving of interaction events from the third-party applications 110 by workflow manager 120, and acts of delivering workflow responses by workflow manager 120 to the third-party applications 110, constitute a continuous flow of communication between the two sets of computing entities. Such continuous communications can facilitate, for example, a selected workflow that is executed partially at content management system 104 and partially at one or more of the third-party applications 110. As merely one representative scenario, a document uploaded to content management system 104 by an interaction event at a first application (e.g., SalesForce) triggers the selection and initiation of a selected workflow according to the herein disclosed techniques. At a certain state in the selected workflow, a response is delivered to a second application (e.g., DocuSign) to manage a certain portion (e.g., document signature collection) of the selected workflow. When that portion of the selected workflow is completed, an interaction event is raised to pass control back to content management system 104 to complete the execution of the selected workflow.

The automatic workflow selection, initiation, and execution capability facilitated by the herein disclosed techniques serve to address the problems attendant to the unnecessary and/or unwanted need for human interaction to select and execute workflows over content objects. As such, application of the techniques disclosed herein facilitate improvements in computer functionality that serve to reduce the demand for computer memory, reduce the demand for computer processing power, reduce network bandwidth use, and reduce the demand for intercomponent communication. Specifically, consumption of computing resources that might be needed to facilitate human interactions with workflows (e.g., presenting user interfaces, raising alerts, etc.) is eliminated.

One embodiment of techniques for such automatic selection and execution of workflows is disclosed in further detail as follows.

Figure 2:
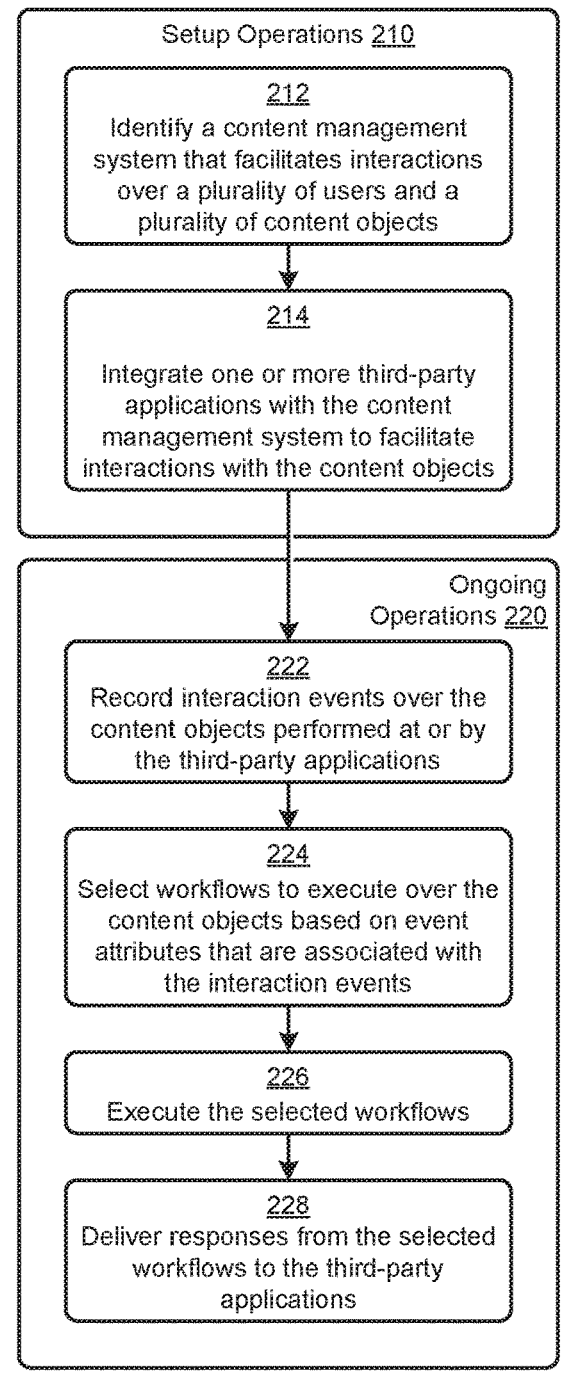
FIG. 2 depicts a workflow selection technique as implemented in systems that perform automatic selection of workflows to execute over content objects, according to an embodiment.

FIG. 2 depicts a workflow selection technique 200 as implemented in systems that perform automatic selection of workflows to execute over content objects. As an option, one or more variations of workflow selection technique 200 or any aspect thereof may be implemented in the context of the architecture and functionality of the embodiments described herein. The workflow selection technique 200 or any aspect thereof may be implemented in any environment.

FIG. 2 illustrates aspects pertaining to analyzing the attributes associated with interactions with content objects to automatically select workflows to execute over the content objects. Specifically, the figure is presented to illustrate one embodiment of certain steps and/or operations performed over a network of devices (e.g., user devices, computing systems, etc.) to record and analyze interactions over content objects performed at third-party applications to select and execute workflows over those content objects. As can be observed, the steps and/or operations can be grouped into a set of setup operations 210 and a set of ongoing operations 220.

Setup operations 210 of workflow selection technique 200 commences by identifying a content management system that facilitates interactions over a plurality of users and a plurality of content objects (step 212). Such interactions can involve both user-to-user interactions and user-content interactions. One or more third-party applications (e.g., apps) are integrated with the content management system to facilitate interactions over the users and/or content objects performed at the apps (step 214). As an example, a sales contract document managed by the content management system might be shared using a first third-party application (e.g., SalesForce) to facilitate the development of the contract after which, the contract might be submitted to a second third-party application (e.g., DocuSign) to facilitate execution (e.g., signing) of the contract. In this case, SalesForce and DocuSign might be registered with the content management system to facilitate authorized access to the sales contract document managed (e.g., stored, updated, etc.) at the content management system. As described herein, the integration and/or registration may also involve establishing certain data structures for organizing application-specific information to facilitate the herein-disclosed workflow selection techniques.

As depicted in ongoing operations 220, any interaction events over the content objects performed at the third-party apps are recorded (step 222). Referring to the aforementioned example, the integration of SalesForce and DocuSign with the content management system might further involve the establishment of an API and/or data structures to record certain event attributes associated with the interaction events at the content management system. Such event attributes might comprise interaction attributes or object attributes. Moreover, such event attributes might comprise interaction attributes or object attributes that are retrieved from an interaction capture and retrieval system that stores interactions in a dataset for later retrieval.

Further details regarding general approaches to such an interaction capture and retrieval system are described in U.S. application Ser. No. 16/154,679 titled, "ON-DEMAND COLLABORATION USER INTERFACES", filed on Oct. 8, 2018, which is hereby incorporated by reference in its entirety.

Based at least in part on the event attributes associated with the interaction events, workflows are selected to execute over one or more of the content objects (step 224). As earlier mentioned, a particular workflow selection operation can be automatically invoked (e.g., with no human involvement) in response to a certain interaction event that occurred at one of the third-party applications. Execution of the selected workflows is then initiated (step 226), which initiation and/or execution can be automatically performed (e.g., with no human involvement) as facilitated by the herein disclosed techniques. As the selected workflows are being executed, various responses are delivered to one or more of the third-party applications (step 228). As merely an example, such responses might describe certain outcomes achieved by the selected workflows.

One embodiment of a system, data flows, and data structures for implementing the workflow selection technique 200 and/or other herein disclosed techniques, is disclosed as follows.

Figure 3:
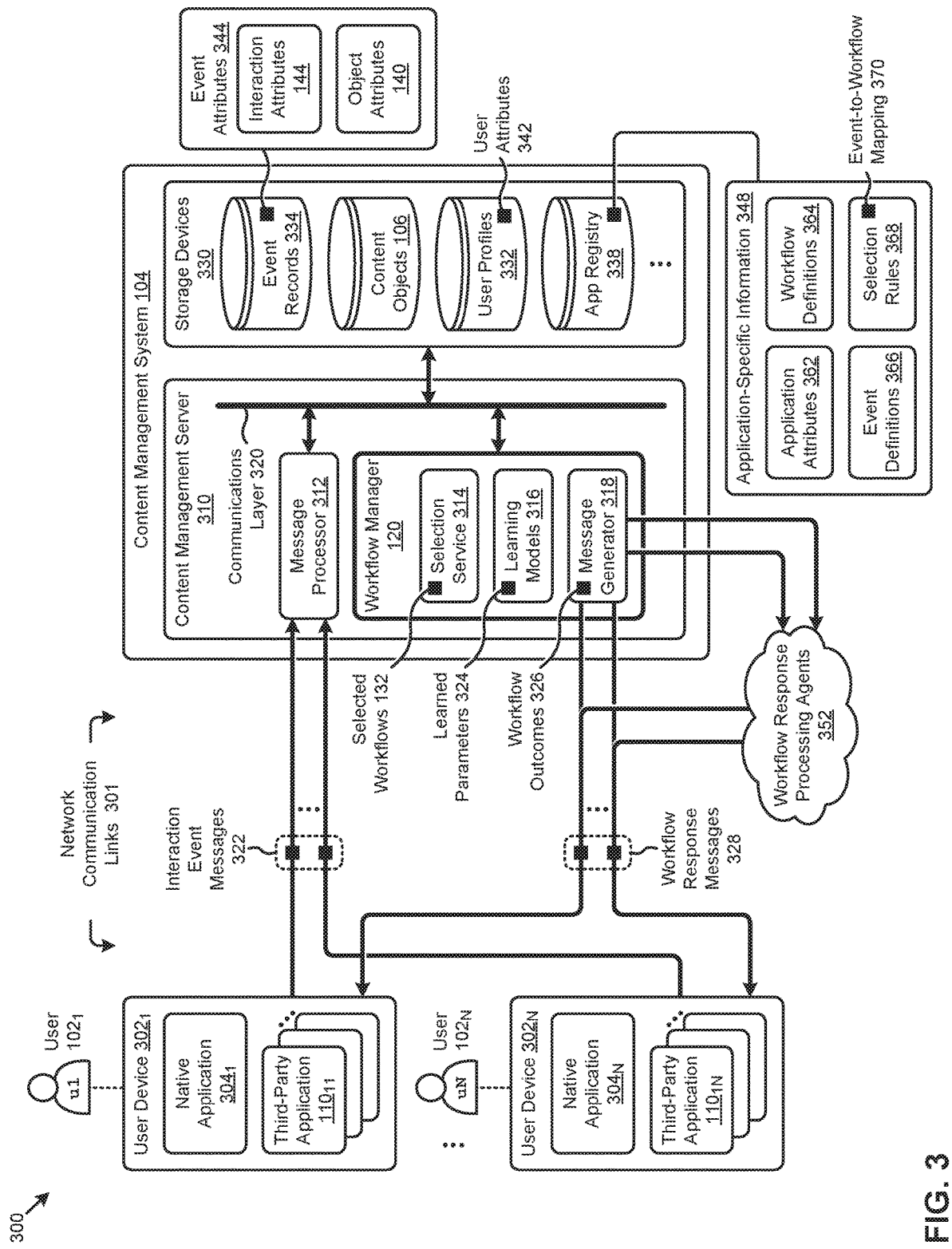
FIG. 3 presents a block diagram of a system that implements automatic selection of workflows to execute over content objects, according to an embodiment.

FIG. 3 presents a block diagram of a system 300 that implements automatic selection of workflows to execute over content objects. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to analyzing the attributes associated with interactions with content objects to automatically select workflows to execute over the content objects. Specifically, the figure is being presented to show one embodiment of certain representative components and associated data structures and data flows implemented in a computing environment to facilitate the herein disclosed techniques. As shown, the components, data flows, and data structures are associated with a set of users (e.g., user $102_1, \ldots,$ user $102_N$) who interact with each other and a set of content objects 106 managed at a content management system 104. The components, data flows, and data structures shown in FIG. 3 present one partitioning and associated data manipulation approach. The specific example shown is purely exemplary, and other subsystems, data structures, and/or partitioning are reasonable.

As shown, system 300 comprises an instance of a content management server 310 operating at content management system 104. Content management server 310 comprises a message processor 312 and an instance of a workflow manager 120, which workflow manager 120 comprises a selection service 314, a set of learning models 316, and a message generator 318. A plurality of instances of the foregoing components might operate at a plurality of instances of servers (e.g., content management server 310) at content management system 104 and/or any portion of system 300. Such instances can interact with a communications layer 320 to access each other and/or a set of storage devices 330 that store various information to support the operation of the components of system 300 and/or any implementations of the herein disclosed techniques.

For example, the servers and/or storage devices of content management system 104 might facilitate interactions over content objects 106 by the users (e.g., user $102_1, \ldots,$ user $102_N$) from a respective set of user devices (e.g., user device $302_1, \ldots,$ user device $302_N$). A content management system "manages" a plurality of content objects at least in part by maintaining (e.g., storing, updating, resolving interaction conflicts, etc.) the content objects subject to the various interactions performed over the content objects by the users of the content objects at their respective user devices. The content objects 106 (e.g., files, folders, etc.) are characterized at least in part by a set of object attributes 140 (e.g., content object metadata) stored at storage devices 330. Furthermore, the users are characterized at least in part by a set of user attributes 342 stored in a set of user profiles 332 at storage devices 330.

The users access instances of a native application (e.g., native application $304_1, \ldots,$ native application $304_N$) and/or instances of various third-party applications (e.g., third-party application $110_{11}, \ldots,$ third-party application $110_{1N}$) to interact with the content objects 106 managed by content management system 104. In some cases, the third-party applications are integrated with content management system 104 to facilitate interactions performed at the third-party applications over the content objects managed by the system. Various information pertaining to such integrations with content management system 104 are codified in an app registry 338 stored in storage devices 330. At least some of the information of app registry 338 comprises various sets of application-specific information 348. As discussed in more detail herein, such application-specific information may comprise instances of application attributes 362, workflow definitions 364, event definitions 366, selection rules 368, and/or other information.

The instances of the native application and/or the third-party applications operating at the user devices send instances of interaction event messages 322 over network communication links 301 that are received by message processor 312 at content management server 310. In some cases, interaction event messages 322 are sent to content management server 310 without human interaction. One class of interaction event messages 322 corresponds to interactions with content objects 106 performed at the third-party applications. As described in further detail herein, such interaction event messages comprise various interaction attributes that describe the interaction events at the third-party applications. The message processor 312 at content management server 310 continuously listens for the interaction event messages 322 and/or polls the third-party applications at certain moments in time to receive instances of interaction event messages 322.

Message processor 312 codifies certain interaction attributes 144 pertaining to the interaction event messages 322 in a set of event records 334 stored in storage devices 330. In some cases, message processor 312 will access the object attributes 140 (e.g., content object types, content object owners, etc.) stored in content objects 106 to facilitate populating the event records 334. As can be observed, certain combinations of interaction attributes 144 and object attributes 140 constitute sets of event attributes 344 that are associated with respective instances of interaction event messages 322 and stored in event records 334.

At certain moments in time, selection service 314 at workflow manager 120 accesses the event attributes 344 stored in event records 334 to select one or more instances of selected workflows 132 from a plurality of workflows. Such workflow selection operations are often invoked by interaction events that occur at content management system 104 or at third-party applications. For example, in response to user $102_1$ uploading a particular content object to content management system 104 using third-party application $110_{11}$ at user device $302_1$, an interaction event message is issued from third-party application $110_{11}$ and forwarded to selection service 314 to invoke a selection of one or more workflows. To facilitate such workflow selections, selection service 314 may apply certain event attributes to selection rules 368 to determine a selected workflow to execute.

As used herein, a set of rules (e.g., rule base), such as selection rules 368 or any other rules described herein, comprises data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results. In some cases, the information pertaining to a rule might comprise the conditions (e.g., predicates, conditional expressions, field names, field values, etc.) and commands and clauses (e.g., "select", "where", "order by", etc.) for forming a data statement (e.g., query) that returns one or more results. As shown for selection rules 368, the aforementioned logic establishes an event-to-workflow mapping 370, which mapping facilitates the selection of certain workflows in response to the detection of certain interaction events. In some cases, the interaction events and workflows referenced by event-to-workflow mapping 370 and/or selection rules 368 are defined by event definitions 366 and workflow definitions 364, respectively.

Initiation and execution of selected workflows 132 are managed by workflow manager 120. As the selected workflow execution progresses, certain workflow outcomes 326 are achieved. Message generator 318 detects such outcomes and generates instances of workflow response messages 328 to deliver to one or more of the third-party applications operating at the user devices of the users. The workflow response messages 328 might merely inform a third-party application of the state of a selected workflow, pass execution control of the selected workflow to the third-party application, and/or be issued for other purposes. In some cases, message generator 318 may deliver certain workflow response messages to one or more workflow response processing agents 352 to perform certain operations over the responses before delivery to the third-party applications. As merely one example, a workflow response processing agent might be a custom function developed by the provider of a third-party application and implemented in a cloud-based hosting environment.

In the embodiment of FIG. 3, one or more learning models 316 are implemented at workflow manager 120 in content management system 104. As used herein, a learning model (e.g., predictive model, etc.) is a collection of mathematical techniques (e.g., algorithms) that facilitate determining (e.g., predicting) a set of outputs (e.g., outcomes, responses) based on a set of inputs (e.g., stimuli). In some cases, the techniques implemented by the model might comprise a set of equations having coefficients that relate one or more of the input variables to one or more of the output variables. In these cases, the equations and coefficients can be determined by a training process. In other cases, the model can map discrete combinations of inputs to respective combinations of outputs.

More specifically, one or more of the learning models 316 receives inputs from various computing entities of content management system 104 to determine (e.g., predict) certain instances of learned parameters 324 that can be applied to facilitate the herein disclosed techniques. For example, a first learning model might consume instances of event attributes 344 as inputs to determine respective instances of learned parameters 324 that are used to adjust the event-to-workflow mapping 370 in selection rules 368. As another example, a second learning model might consume inputs from users during execution of certain selected workflows to determine respective instances of learned parameters 324 that are used to adjust the workflow definitions so as to facilitate automatic traversal of certain workflow steps and thereby eliminate or reduce the unnecessary and/or unwanted need for human interaction when executing the workflow. In some cases, certain human activities are expressly excluded from the learning model. For example, if, for governance or compliance reasons, certain particular types of human activities are demanded (e.g., to complete a certification or to complete a declaration), then those types of human activities are not subjected to automatic traversal in absence of the demanded human activities.

The foregoing discussion includes techniques for integrating third-party applications with a content management system (e.g., step 214 of FIG. 2) and examples of related application-specific information (e.g., application-specific information 348) stored in an app registry (e.g., app registry 338), which techniques are disclosed in further detail as follows.

Figure 4:
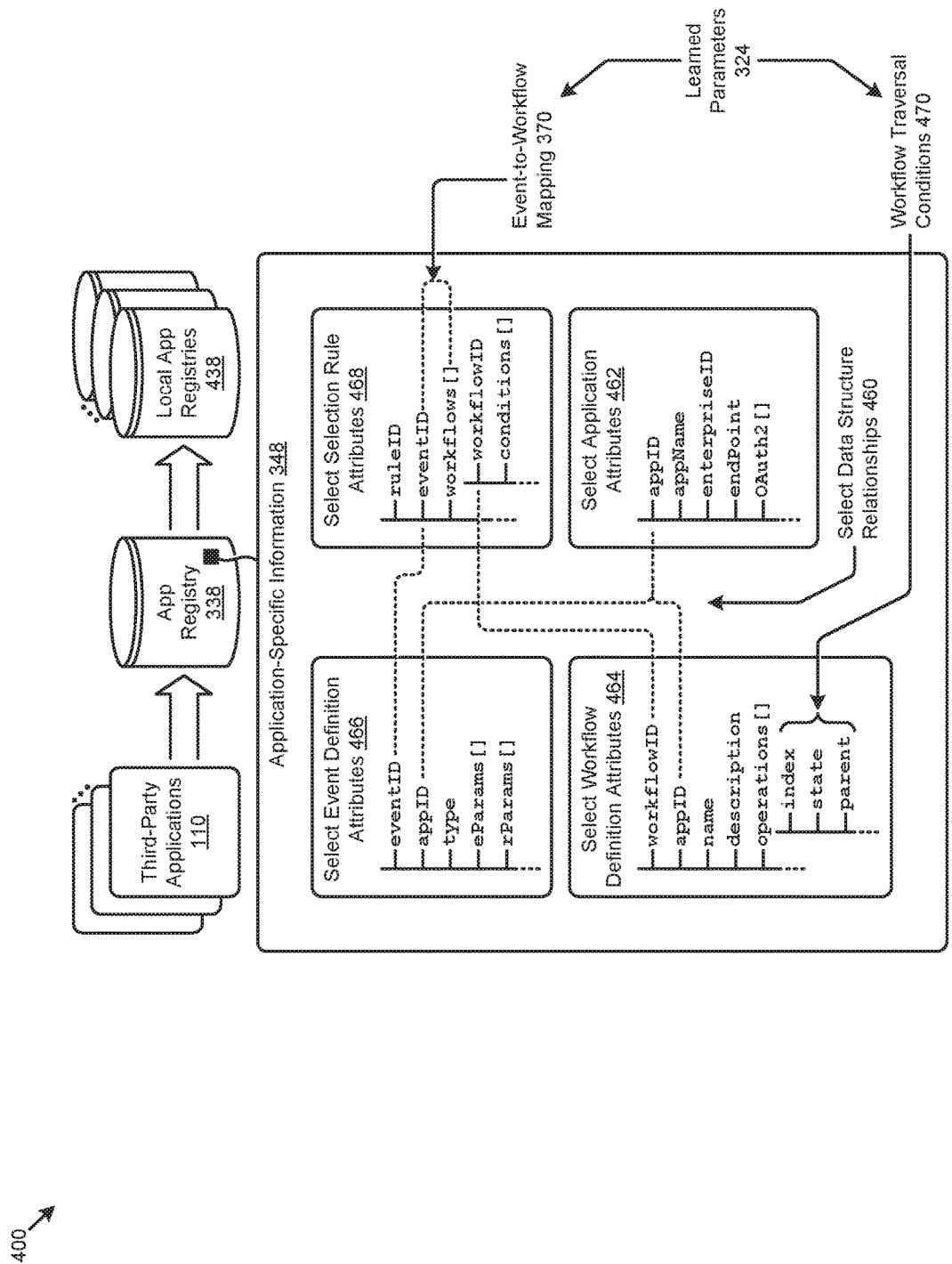
FIG. 4 depicts an application integration technique as implemented in systems that perform automatic selection of workflows to execute over content objects, according to an embodiment.

FIG. 4 depicts an application integration technique 400 as implemented in systems that perform automatic selection of workflows to execute over content objects. As an option, one or more variations of application integration technique 400 or any aspect thereof may be implemented in the context of the architecture and functionality of the embodiments described herein. The application integration technique 400 or any aspect thereof may be implemented in any environment.

FIG. 4 illustrates aspects pertaining to analyzing the attributes associated with interactions with content objects to automatically select workflows to execute over the content objects. Specifically, the figure presents certain specialized data structures for organizing and/or storing certain application-specific information associated with the integration third-party applications with a content management system. Such integrations facilitate at least some of the aforementioned interactions with content objects managed by the content management system. Moreover, the application-specific information associated with the integrations facilitate at least some embodiments of the herein disclosed techniques.

Specifically, the specialized data structures associated with the application-specific information are configured to improve the way a computer stores and retrieves certain data in memory when performing the herein disclosed techniques. The application-specific information can be organized and/or stored in accordance with these data structures using various techniques. For example, the representative data structures associated with application-specific information 348 shown in FIG. 4 indicate that the constituent data of the data structures might be organized and/or stored in a tabular structure (e.g., relational database table) that has rows that relate various attributes with a particular data entity. As another example, the underlying data might be organized and/or stored in a programming code object that has instances corresponding to a particular data entity and properties corresponding to the various attributes associated with the data entity. A representative set of select data structure relationships 460 between certain data entities contained in application-specific information 348 are also shown.

When certain instances of third-party applications 110 are integrated (e.g., registered) with a content management system, respective sets of application-specific information 348 are populated in an app registry 338. In some cases, certain portions of the application-specific information 348 are populated in response to various inputs (e.g., selections, entered text, etc.) received from system administrators and/or application developers by interacting with a user interface (e.g., admin and/or developer console). For example, an application developer might first register an application, then a system administrator might define certain events and/or workflows associated with the applications. As shown, some or all of the information from app registry 338 might be replicated to instances of local app registries 438. For example, a local app registry might be stored as a set of metadata associated with a particular third-party application operating at a user device that is remote to the content management system. The metadata of the local app registry might be accessed to facilitate certain of the herein disclosed techniques (e.g., issuing interaction event messages, etc.).

As indicated in a set of select application attributes 462 in application-specific information 348, each of the third-party applications 110 that are registered with the content management system is identified by an application identifier (e.g., stored in an "appID" field), an application name (e.g., stored in an "appName" field), an enterprise identifier (e.g., stored in an "enterpriseID" field), an endpoint URL (e.g., stored in an "endpoint" field), a set of OAuth2 credentials (e.g., stored in an "OAuth2 [ ]" object), and/or other attributes. As can be observed, the application identifier or "appID" is referenced by other data structures to associate the data underlying those structures with a particular third-party application. Certain attributes (e.g., "enterpriseID", "endpoint", etc.) from select application attributes 462 might be included in interaction event messages from the third-party applications to facilitate identification of the particular instances of the third-party application or applications that issued the messages.

Such interaction event messages may also identify one or more interaction events as defined by a set of select event definition attributes 466. As can be observed, an interaction event associated with an application identified in an "appID" field is defined by an event identifier (e.g., stored in an "eventID" field), an event type description (e.g., stored in a "type" field), a set of event parameters specific to the event (e.g., stored in an "eParams [ ]" object), a set of response parameters specific to the event (e.g., stored in an "rParams [ ]" object), and/or other attributes.

Various workflows are also defined in the application-specific information 348 in accordance with a set of select workflow definition attributes 464. Specifically, a particular workflow associated with an application identified in an "appID" field is defined by a workflow identifier (e.g., stored in a "workflowID" field), a workflow name (e.g., stored in a "name" field), a workflow description (e.g., stored in a "description" field), a set of operations associated with the workflow (e.g., stored in an "operations [ ]" object), and/or other attributes. As can be observed, each operation of the workflow is described by an operation sequence index (e.g., stored in an "index" field), an operation state description (e.g., stored in a "state" field), a parent operation associated with the operation (e.g., stored in a "parent" field), and/or other attributes. As depicted, the then-current values associated with the "index", "state", and "parent" fields constitute a then-current set of workflow traversal conditions 470 that determine certain actions to be performed in the execution of the workflow. For example, if a then-current instance of the workflow traversal conditions 470 indicates "index=8" and "status=complete", then an action might be taken to move to an operation having a next higher index value (e.g., "index=9").

The interaction events and workflows defined in the application-specific information 348 can be associated in various selection rules described by a set of select selection rule attributes 468. The select selection rule attributes 468 indicates that a particular selection rule is described by a rule identifier (e.g., stored in a "rule ID" field), an event identifier (e.g., stored in an "event ID" field), one or more workflows associated with the interaction event identifier (e.g., stored in a "workflows [ ]" object), and/or other attributes. Each workflow associated with the event identifier is described by a workflow identifier (e.g., stored in a "workflowID" field), one or more conditions for initiating the workflow (e.g., stored in a "conditions [ ]" object), and/or other attributes.

As can be observed, the relationship between the interaction events identified by the "eventID" attribute and the workflows identified in the "workflows [ ]" object constitute the event-to-workflow mapping 370 earlier described. The conditions associated with each workflow that is mapped to a particular interaction event describe the conditions that need to be present for the mapping to be true and/or for workflow execution to be initiated. As merely one example, a particular workflow may be associated with a particular interaction event, but a certain combination of event attribute values may be needed to satisfy the conditions corresponding to the workflow to allow the workflow to be selected in response to the interaction event. As another example, consider a first workflow and a second workflow that is associated with an interaction event in a particular selection rule. In such a scenario, a compound workflow selection rule can be constructed such that (1) when the conditions associated with the first workflow are satisfied, the rule allows the first workflow to be immediately executed, (2) even when the conditions associated with the second workflow are satisfied, the rule only allows the second workflow to be executed after the first workflow has successfully completed.

As depicted in FIG. 4, the event-to-workflow mapping 370 and the workflow traversal conditions 470 can comprise instances of learned parameters 324 associated with one or more learning models that may be implemented in certain embodiments of the herein disclosed techniques. As such, adjustments to the learning models achieved over time may result in adjustments to certain learned parameters that comprise the event-to-workflow mapping 370 and the workflow traversal conditions 470. As one example, a first learning model may produce a first set of learned parameters that add or remove a workflow that is mapped to an interaction event in a selection rule, and/or that modify the conditions associated with a workflow identified in the rule. As another example, a second learning model may produce a second set of learned parameters that modify one or more workflow traversal conditions in a workflow definition. More specifically, the second set of learned parameters might be applied to bypass a workflow operation (e.g., a branching decision) that involves human interaction.

The foregoing discussion includes techniques for recording interaction events based at least in part on the event attributes associated with interaction events performed over content objects at third-party applications (e.g., step 222 of FIG. 2), which techniques are disclosed in further detail as follows.

Figure 5:
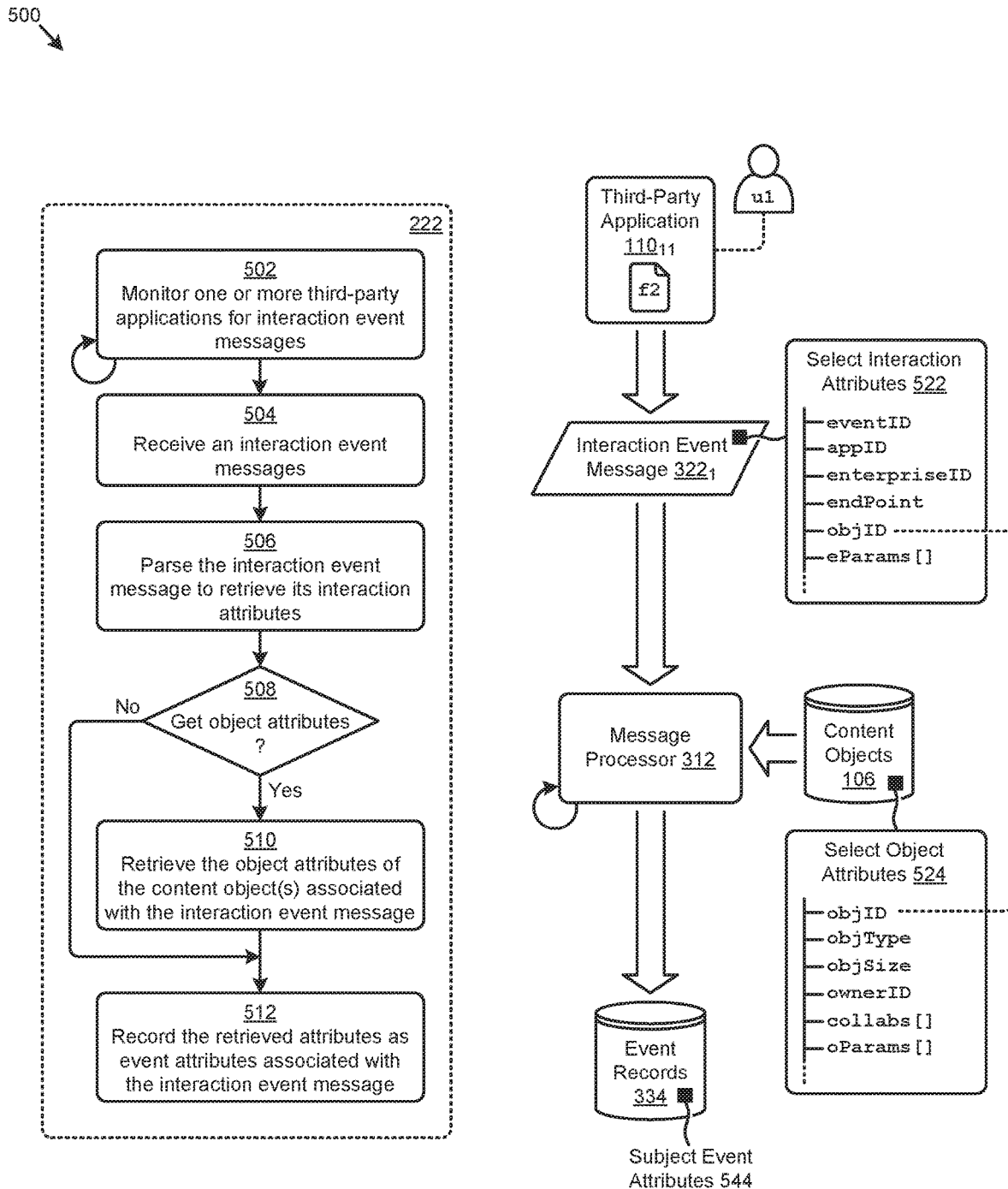
FIG. 5 depicts an interaction event recording technique as implemented in systems that perform automatic selection of workflows to execute over content objects, according to an embodiment.

FIG. 5 depicts an interaction event recording technique 500 as implemented in systems that perform automatic selection of workflows to execute over content objects. As an option, one or more variations of interaction event recording technique 500 or any aspect thereof may be implemented in the context of the architecture and functionality of the embodiments described herein. The interaction event recording technique 500 or any aspect thereof may be implemented in any environment.

FIG. 5 illustrates aspects pertaining to analyzing the attributes associated with interactions with content objects to automatically select workflows to execute over the content objects. Specifically, the figure is presented to illustrate one embodiment of certain steps and/or operations that facilitate recording interaction events performed over content objects at third-party applications. As depicted in the figure, the steps and/or operations are associated with step 222 of FIG. 2. A representative scenario is also shown in the figure to illustrate an example application of interaction event recording technique 500.

The interaction event recording technique 500 commences by monitoring one or more third-party applications for interaction event messages (step 502). As illustrated, an instance of message processor 312 may continuously listen or poll for interaction event messages issued from a plurality of third-party applications that includes the third-party application $110_{11}$ accessed by user "u1". When an interaction event message is received (step 504), the interaction event message is parsed to retrieve one or more interaction attributes (step 506). As shown, message processor 312 receives an interaction event message $322_1$ in response to user "u1" viewing the file "f2" in third-party application $110_{11}$. As indicated by a set of select interaction attributes 522, the interaction attributes associated with interaction event message $322_1$ includes an event identifier (e.g., stored in an "event ID" field), and application identifier (e.g., stored in an "appID" field), an enterprise identifier (e.g., stored in an "enterprise ID" field), an endpoint URL (e.g., stored in an "endpoint" field), a content object identifier (e.g., stored in an "objID" field), a set of event parameters specific to the event (e.g., stored in an "eParams [ ]" object), and/or other attributes.

If object attributes are to be considered ("Yes" path of decision 508), then the object attributes of the one or more content objects associated with the interaction event message are retrieved (step 510). In this case, message processor 312 accesses the datastore of content objects 106 to retrieve certain object attributes associated with a content object identified in the "objID" field of interaction event message $322_1$. As depicted in a set of select object attributes 524, such object attributes might comprise the content object identifier (e.g., stored in an "objID" field), a content object type (e.g., stored in an "objType" field), a content object size (e.g., stored in an "objsize" field), a content object owner identifier (e.g., stored in an "ownerID" field), a list of collaborators over the content object (e.g., stored in a "collabs [ ]" object), a set of object parameters specific to the content object (e.g., stored in an "oParams [ ]" object), and/or other attributes.

All retrieved attributes are then recorded as event attributes associated with the interaction event message (step 512). As stated, if object attributes are to be considered ("Yes" path of decision 508), the event attributes comprise the retrieved interaction attributes and the retrieved object attributes. If no object attributes are considered ("No" path of decision 508), the event attributes comprise merely the retrieved interaction attributes. In the shown scenario, message processor 312 stores in event records 334 a set of subject event attributes 544 that are associated with interaction event message $322_1$.

The foregoing discussion includes techniques for selecting workflows based at least in part on the event attributes associated with interaction events performed over content objects at third-party applications (e.g., step 224 of FIG. 2), which techniques are disclosed in further detail as follows.

Figure 6:
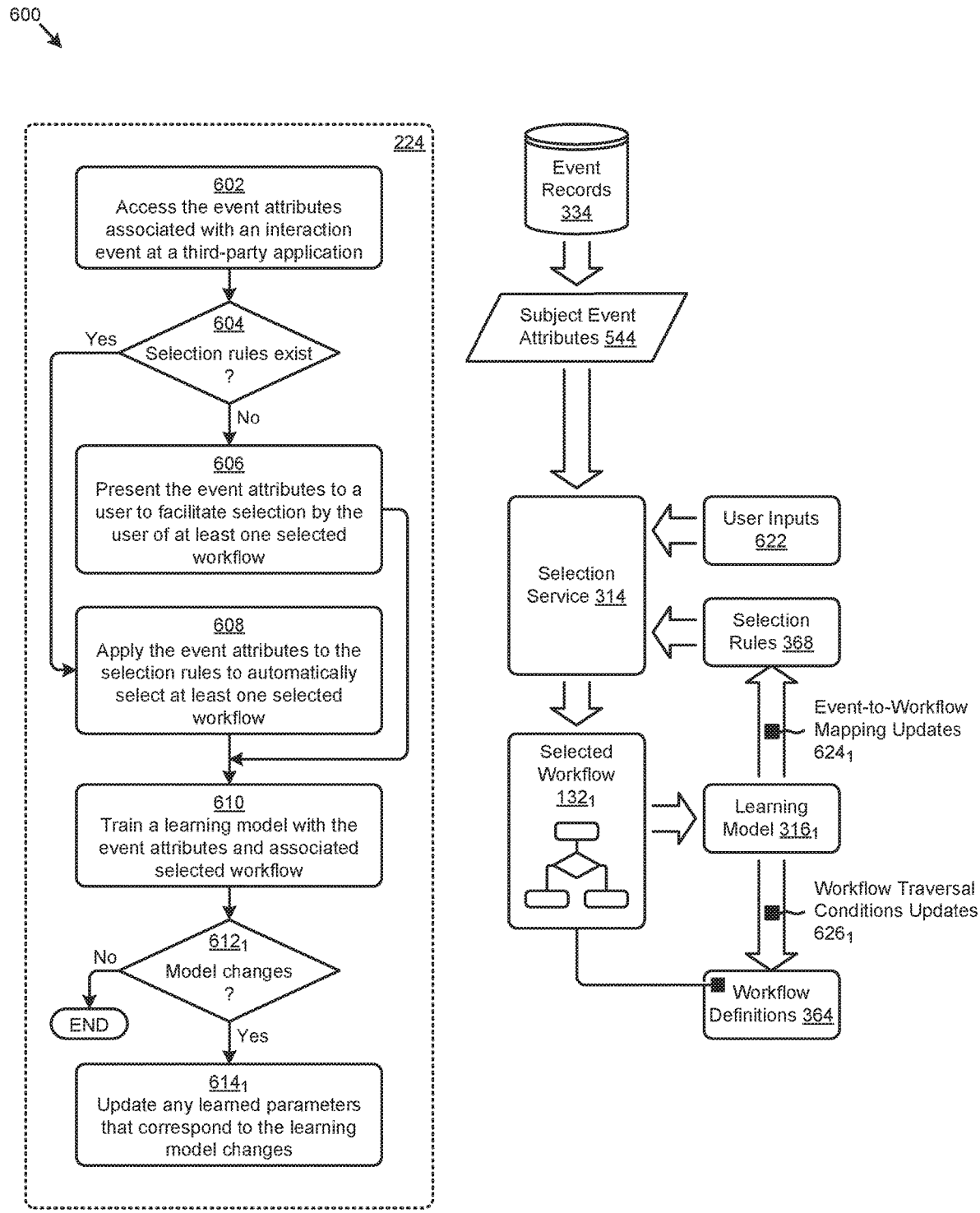
FIG. 6 presents an event-based workflow selection technique as implemented in systems that perform automatic selection of workflows to execute over content objects, according to an embodiment.

FIG. 6 presents an event-based workflow selection technique 600 as implemented in systems that perform automatic selection of workflows to execute over content objects. As an option, one or more variations of event-based workflow selection technique 600 or any aspect thereof may be implemented in the context of the architecture and functionality of the embodiments described herein. The event-based workflow selection technique 600 or any aspect thereof may be implemented in any environment.

FIG. 6 illustrates aspects pertaining to analyzing the attributes associated with interactions with content objects to automatically select workflows to execute over the content objects. Specifically, the figure is presented to illustrate one embodiment of certain steps and/or operations that facilitate selecting workflows based at least in part on the event attributes associated with interaction events performed over content objects at third-party applications. As depicted in the figure, the steps and/or operations are associated with step 224 of FIG. 2. A representative scenario is also shown in the figure to illustrate an example application of event-based workflow selection technique 600.

The event-based workflow selection technique 600 commences by accessing a set of event attributes associated with an interaction event performed at a third-party application (step 602). As illustrated, an instance of selection service 314 accesses the earlier described set of subject event attributes 544 from event records 334. If no selection rules exist ("No" path of decision 604), the event attributes are presented to a user to facilitate selection of at least one selected workflow (step 606). For example, selection service 314 might present some or all of subject event attributes 544 to a user in a user interface to solicit instances of user inputs 622 that serve to identify a selected workflow $132_1$. When one or more selection rules do exist ("Yes" path of decision 604), the event attributes are applied to the selection rules to automatically select at least one selected workflow (step 608). As another example, selection service 314 might apply some or all of subject event attributes 544 to selection rules 368 to select the selected workflow $132_1$.

A learning model is trained with the event attributes and associated selected workflow (step 610). For example, subject event attributes 544 and selected workflow 132₁ may be one of many sets of inputs and associated outputs that are applied to a learning model that is configured to predict a workflow selection based at least in part on various combinations of event attributes. Strictly as examples, a learning model can be trained to predict a workflow selection based at least in part on the event of selecting a workflow, or based at least in part on the event of initiating execution of a particular workflow.

If no changes to learning model 316₁ are present ("No" path of decision 612₁), then no further action is taken. If changes to the learning model are produced ("Yes" path of decision 612₁), then any learned parameters associated with the learning model are updated in response to the learning model changes (step 614₁). As merely examples, changes to learning model 316₁ might produce a set of event-to-workflow mapping updates 624₁ to apply to selection rules 368 and/or might produce a set of workflow traversal conditions updates 626₁ to apply to workflow definitions 364. As illustrated, changes to workflow definitions 364 may change the operations, order of operations, and/or other aspects of selected workflow 132₁.

The foregoing discussion includes techniques for executing selected workflows (e.g., step 226 of FIG. 2) and delivering responses from the executed workflows (e.g., step 228 of FIG. 2), which techniques are disclosed in further detail as follows.

Figure 7A:
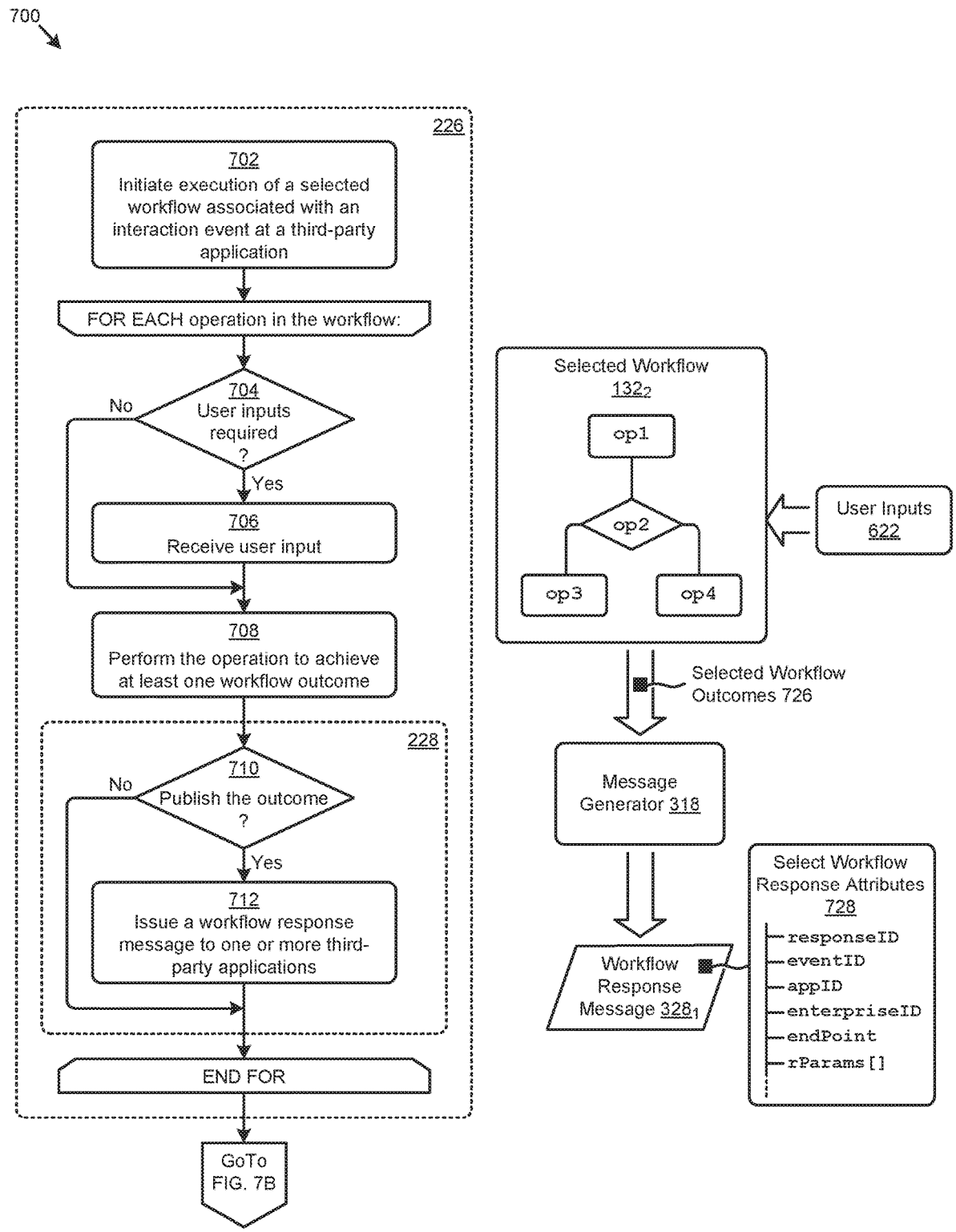
FIG. 7A and FIG. 7B present a workflow response delivery technique as implemented in systems that perform automatic selection of workflows to execute over content objects, according to an embodiment.
Figure 7B:
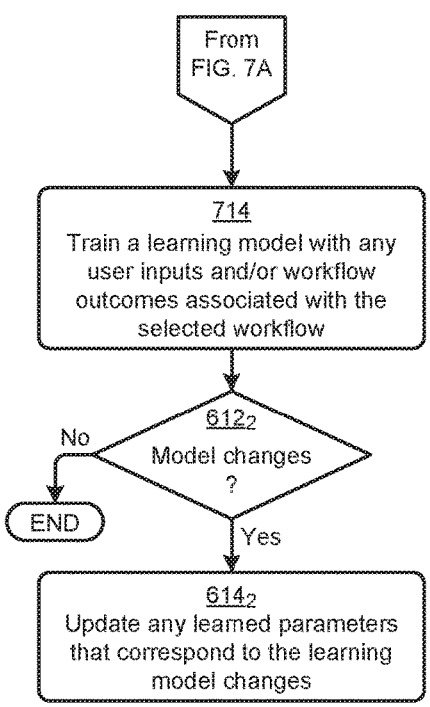
Figure 7B:
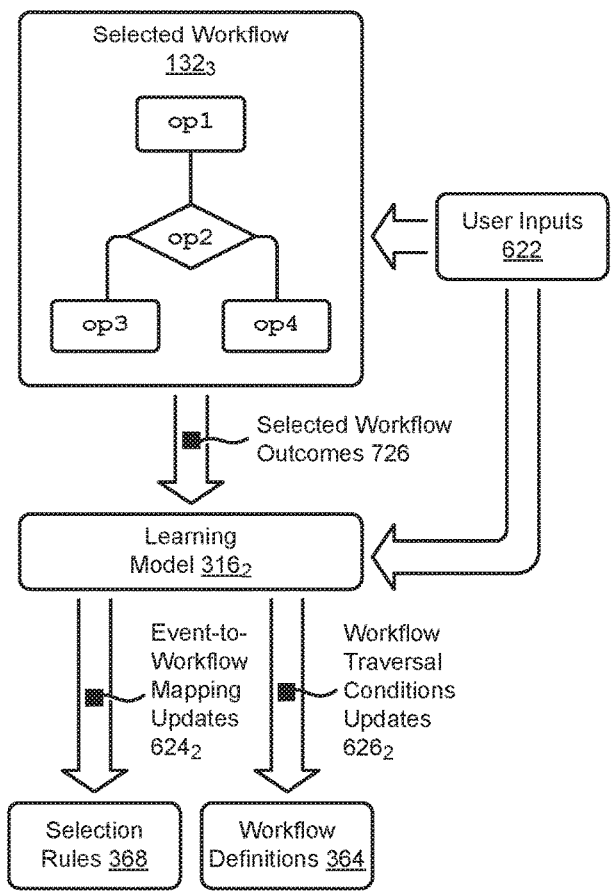

FIG. 7A and FIG. 7B present a workflow response delivery technique 700 as implemented in systems that perform automatic selection of workflows to execute over content objects. As an option, one or more variations of workflow response delivery technique 700 or any aspect thereof may be implemented in the context of the architecture and functionality of the embodiments described herein. The workflow response delivery technique 700 or any aspect thereof may be implemented in any environment.

FIG. 7A and FIG. 7B illustrate aspects pertaining to analyzing the attributes associated with interactions with content objects to automatically select workflows to execute over the content objects. Specifically, the figures are presented to illustrate one embodiment of certain steps and/or operations that facilitate executing workflows selected according to the herein disclosed techniques and delivering responses from the executed workflows. As depicted in FIG. 7A, the steps and/or operations are associated with step 226 and step 228 of FIG. 2. A representative scenario is also shown in FIG. 7A and FIG. 7B to illustrate an example application of workflow response delivery technique 700.

The workflow response delivery technique 700 commences by initiating the execution of a selected workflow associated with an interaction event performed at a third-party application (step 702). As shown in the representative scenario, the execution of a selected workflow 132₂ that is selected according to the herein disclosed techniques is initiated. For illustrative purposes, selected workflow 132₂ comprises merely four operations (e.g., operation "op₁", operation "op₂", operation "op₃", and operation "op₄") arranged as shown.

As each operation in the selected workflow is traversed, if user input is required for the operation ("Yes" path of decision 704), then the user input is received (step 706). For example, operation "op₂" of selected workflow 132₂ might require certain human interaction. Specifically, operation "op₂" might ask a user to decide between operation "op₃" and operation "op₄" as the next operation to be executed in the workflow. In this case, a set of user inputs 622 might be received to indicate the user's choice. Whether inclusive of user inputs ("Yes" path of decision 704) or exclusive of user inputs ("No" path of decision 704), the operation is executed to achieve at least one outcome (step 708). In the foregoing example, an outcome might be that the conditions pertaining to operation "op₂" has changed from "active" to "complete" and that the status of selected next operation has changed from "pending" to "active".

If the outcome associated with the operation is to be published ("Yes" path of decision 710), then a workflow response message corresponding to the outcome is issued to one or more third-party applications (step 712). As shown, an instance of message generator 318 receives an instance of selected workflow outcomes 726 pertaining to an operation of selected workflow 132₂ and issues a workflow response message 328₁ to one or more third-party applications.

As indicated in a set of select workflow response attributes 728, a workflow response message might comprise a response identifier (e.g., stored in a "responseID" field), an event identifier (e.g., stored in an "eventID" field), an application identifier (e.g., stored in an "appID" field), an enterprise identifier (e.g., stored in an "enterpriseID" field), an endpoint URL (e.g., stored in an "endpoint" field), a set of response parameters specific to the event (e.g., stored in an "rParams [ ]" object), and/or other attributes. In some cases, the response parameters characterize the workflow outcome that corresponds to the workflow response message 328₁. If the outcome associated with the operation is not to be published ("No" path of decision 710), then the workflow moves to the next operation in the workflow with no workflow response message being issued.

Referring to FIG. 7B, the workflow response delivery technique 700 includes training a learning model with any user inputs and/or workflow outcomes associated with the selected workflow (step 714). For example, user inputs 622 and selected workflow outcomes 726 associated with selected workflow 132₃ may be one of many sets of inputs and associated outputs that are applied to a learning model 316₂ that is configured to predict workflow outcomes based at least in part on various combinations of user inputs and/or other workflow outcomes. If no changes to the model are present ("No" path of decision 612₂), then no further actions are taken. If changes to the learning model are produced ("Yes" path of decision 612₂), then any learned parameters associated with the learning model are updated in response to the learning model changes (step 614₂).

As merely examples, changes to learning model 316₂ might produce a set of event-to-workflow mapping updates 624₂ to apply to selection rules 368 and/or might produce a set of workflow traversal conditions updates 626₂ to apply to workflow definitions 364. More specifically, as pertaining to selected workflow 132₃, if a user selects operation "op₃" a certain number of times when asked at operation "op₂", then the learning model may invoke changes to selection rules 368 and/or workflow definitions 364 to present to the user a confirmation of an operation "op₃" selection, rather than present a choice between operation "op₃" and operation "op₄". If the number of times the user selects and/or confirms operation "op₃" reaches a certain statistical threshold, then the learning model 316₂ may invoke changes to selection rules 368 and/or workflow definitions 364 to bypass operation "op₂" entirely, thereby eliminating the unnecessary and unwanted need for human interaction (e.g., user inputs) when executing the selected workflow.

Additional Embodiments of the Disclosure

Additional Practical Application Examples

Figure 8A:
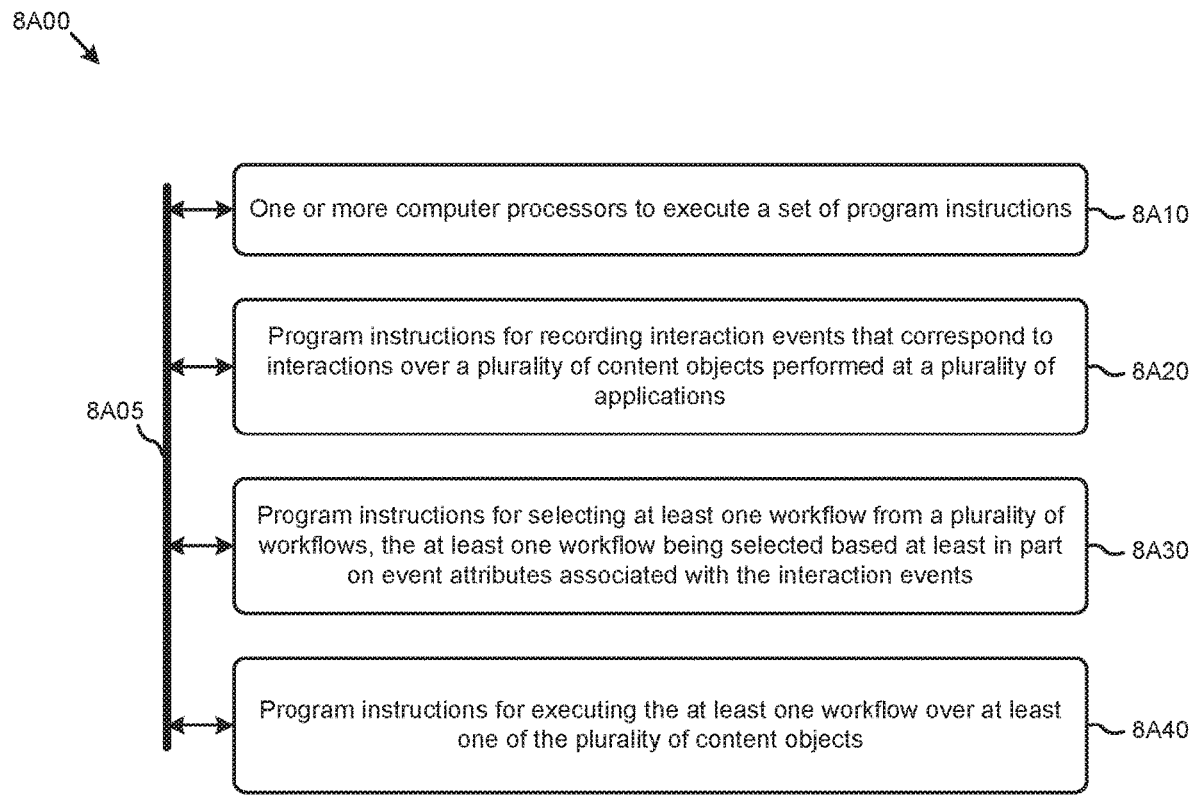
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. This and other embodiments present particular arrangements of elements that, individually or as combined, serve to form improved technological processes that address unwanted need for human interaction to execute workflows over content objects. The partitioning of system 8A00 is merely illustrative and other partitions are possible.

As an option, the system 8A00 may be implemented in the context of the architecture and functionality of the embodiments described herein. Of course, however, the system 8A00 or any operation therein may be carried out in any desired environment. The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with any other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising one or more computer processors to execute a set of program code instructions (module 8A10) and modules for accessing memory to hold program code instructions to perform: recording interaction events that correspond to interactions over a plurality of content objects performed at a plurality of applications (module 8A20); selecting at least one workflow from a plurality of workflows, the at least one workflow being selected based at least in part on event attributes associated with the interaction events (module 8A30); and executing the at least one workflow over at least one of the plurality of content objects (module 8A40).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 8B:
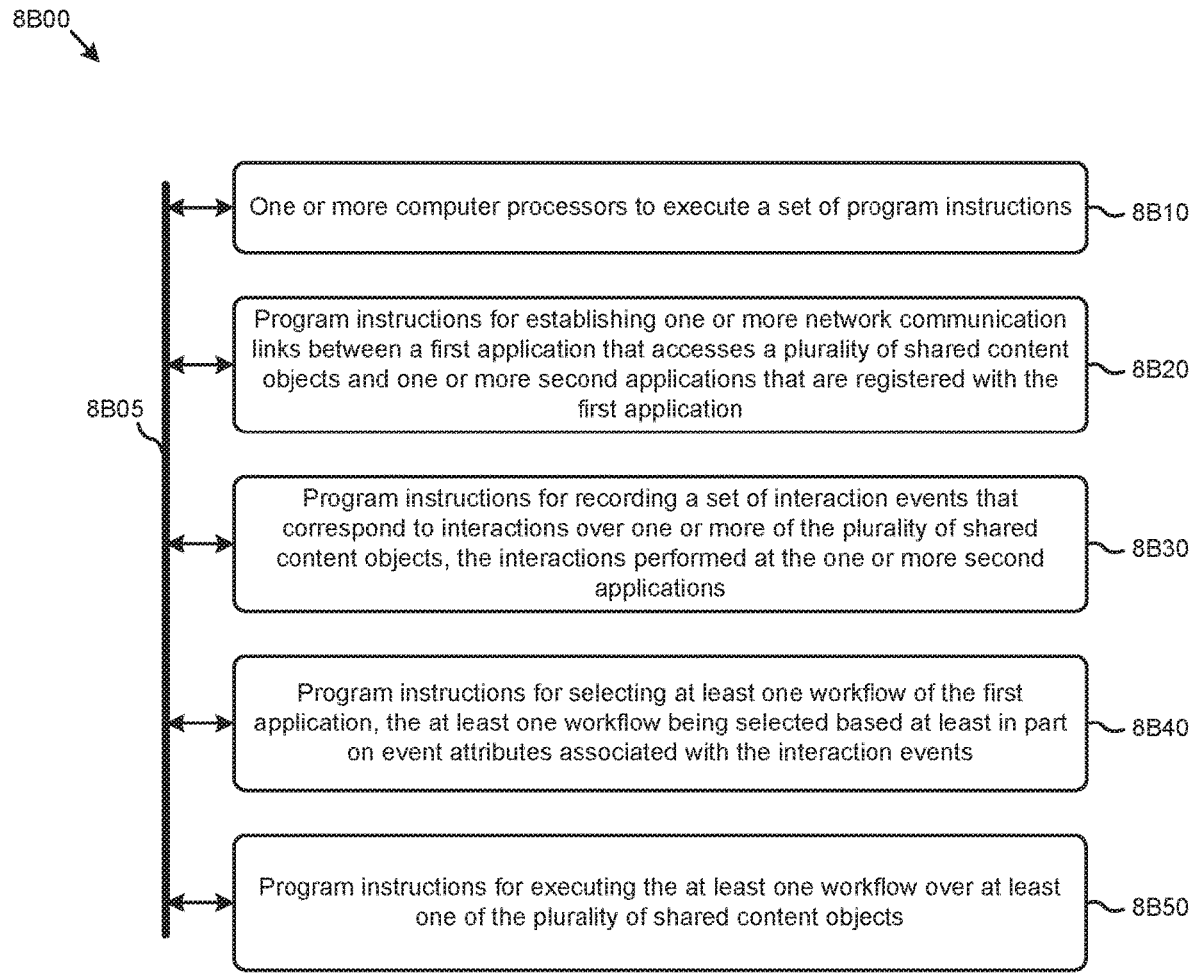

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with any other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising one or more computer processors to execute a set of program code instructions (module 8B10) and modules for accessing memory to hold program code instructions to perform: establishing one or more network communication links between a first application that accesses a plurality of shared content objects and one or more second applications that are registered with the first application (module 8B20); recording a set of interaction events that correspond to interactions over one or more of the plurality of shared content objects, the interactions performed at the one or more second applications (module 8B30); selecting at least one workflow of the first application, the at least one workflow being selected based at least in part on event attributes associated with the interaction events (module 8B40); and executing the at least one workflow over at least one of the plurality of shared content objects (module 8B50).

Systen Architecture Overview

Additional System Architecture Examples

Figure 9A:
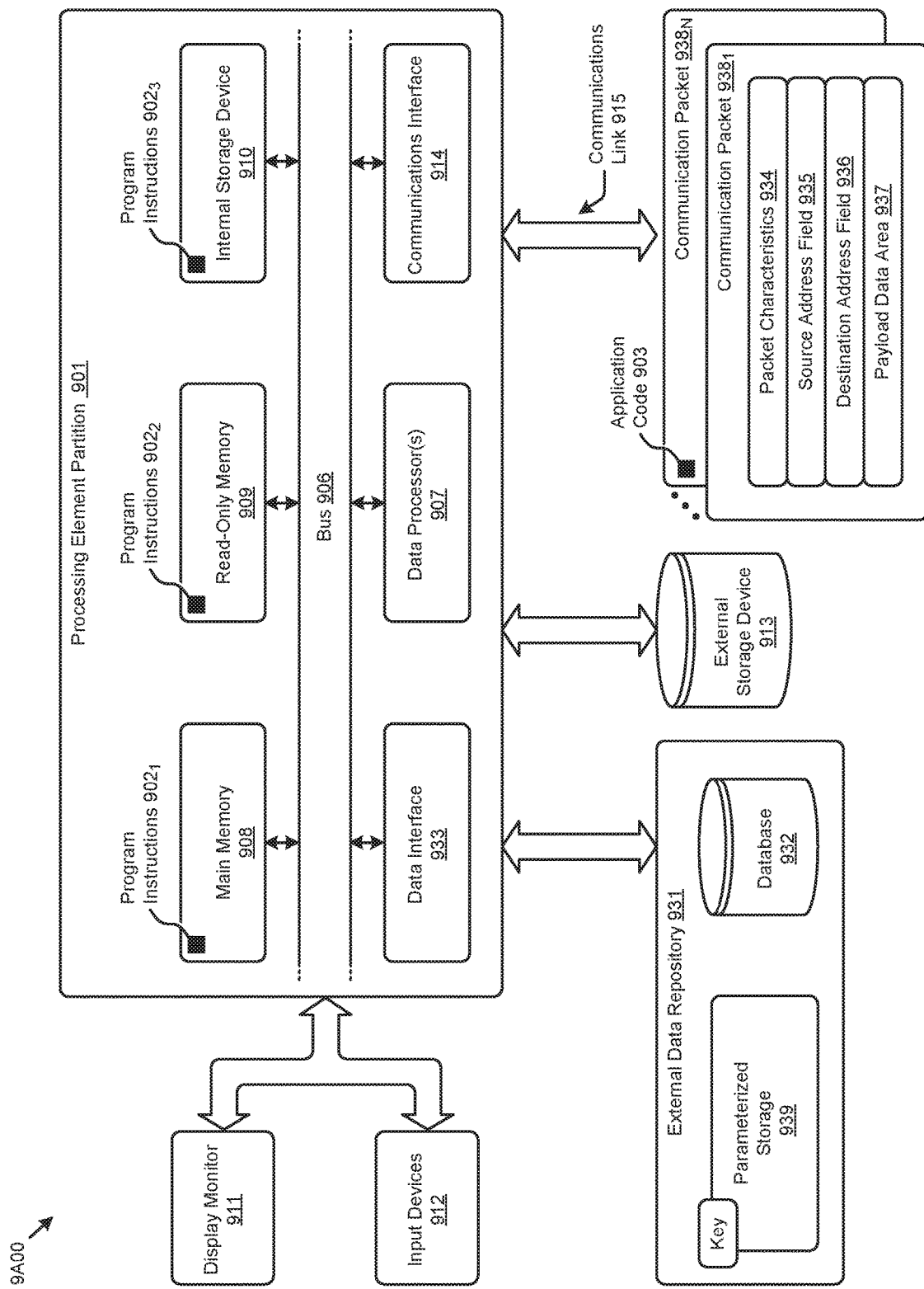
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program instructions may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to automatically selecting workflows to execute over content objects. A module may include one or more state machines and/or combinational logic used to implement or facilitate the operational and/or performance characteristics pertaining to automatically selecting workflows to execute over content objects.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of automatically selecting workflows to execute over content objects). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations to automatically select workflows to execute over content objects, and/or for improving the way data is manipulated when performing computerized operations pertaining to analyzing the attributes associated with interactions with content objects to automatically select workflows to execute over the content objects.

Figure 9B:
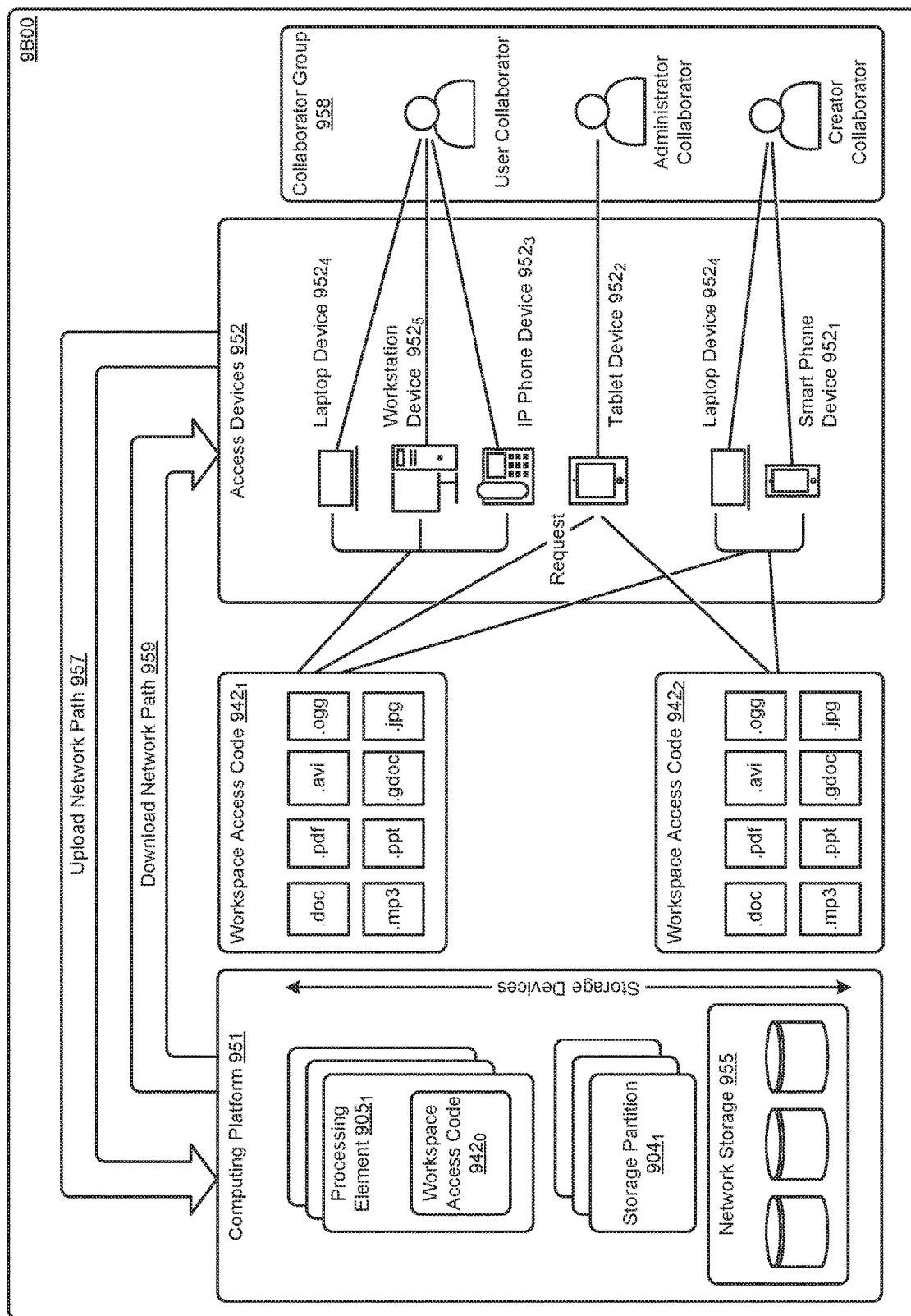

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of access devices 952 (e.g., laptop device $952_4$, workstation device $952_5$, IP phone device $952_3$, tablet device $952_2$, smart phone device $952_1$, etc.), and can be configured to access any type of object. Strictly as examples, such objects can be folders or directories or can be files of any filetype. A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for workflow selection, the method comprising:
    establishing one or more network communication links between a content management system that manages a plurality of shared content objects, a first application of a first type, and a second application of a second type that are registered with the content management system;
    recording a set of interaction events that correspond to interactions that modify contents into modified contents of at least one shared content object of the plurality of shared content objects, the interactions performed at the first application invoked by a plurality of user computing devices for collaboration on the at least one content object;
    constructing a training dataset with first training data pertaining to a plurality of event attributes, second training data pertaining to a plurality of content object attributes, and third training data pertaining to one or more workflows of a plurality of workflows;
    training at least one learning model with the training dataset that comprises the first training data pertaining to the plurality of event attributes and the second training data pertaining to the one or more workflows;
    in response to the interactions performed at the first application, selecting, from the plurality of workflows, at least one workflow that corresponds to the second application based at least in part on an event attribute associated with the set of interaction events, wherein the at least one learning model facilitates at least one of selecting the at least one workflow, or forming one or more responses from execution of the at least one workflow; and
    executing the at least one workflow that facilitates the collaboration on the at least one content object by performing a modification on the modified contents of the at least one shared content object, the modification performed by the second application.

2. The method of claim 1, further comprising:
    in response to receiving the training dataset as inputs to the at least one learning model, identifying a first change to the at least one learning model;
    determining one or more parameters pertaining to a mapping between an interaction event and a corresponding workflow of the at least one learning model based at least upon the first change; and
    applying one or more selection rules to the at least one learning model based at least in part upon the one or more parameters that have been identified as pertaining to the mapping, wherein the at least one learning model is trained based at least in part on at least one of selecting the at least one workflow, or initiating execution of the at least one workflow.

3. The method of claim 1, further comprising:
    in response to receiving the training dataset as inputs to the at least one learning model, identifying a second change to the at least one learning model;
    determining one or more conditions of the at least one learning model pertaining to traversal of at least one of the plurality of workflows based at least upon the second change; and
    applying the one or more conditions to one or more characteristics of the one or more workflows of the plurality of workflows, wherein the at least one learning model adjusts one or more learned parameters associated with at least one of, one or more selection rules, or one or more workflow definitions.

4. The method of claim 1, wherein selecting the at least one workflow is based at least in part on one or more selection rules, the first and the second applications are respectively located on respective user computing devices of one or more users of the plurality of user computing devices for the collaboration on the at least one content object, the first application is invoked in a first workflow in which the contents are modified into the modified contents, and the second application is invoked in the at least one workflow in which the modified contents in further modified by the modification.

5. The method of claim 4, wherein the one or more selection rules cause a first workflow to be executed when one or more conditions associated with the first workflow are satisfied.

6. The method of claim 5, wherein the first workflow causes a second workflow to be executed.

7. The method of claim 5, wherein the one or more selection rules cause a second workflow to be executed after the first workflow has successfully completed.

8. The method of claim 1, wherein at least one of selecting the at least one workflow, or executing the at least one workflow is performed without human interaction, the first application is local to a user computing device of the plurality of user computing devices, the second application is remotely invoked by the user computing device, and at least some information or data pertaining to the second application is replicated to one or more instances pertaining to the first application that is local to the user computing device.

9. The method of claim 1, wherein the plurality of event attributes comprises at least one of one or more interaction attributes associated with the interactions, or one or more object attributes associated with the plurality of shared content objects.

10. The method of claim 1, wherein the content management system includes a native application, and the first and second application comprise third-party applications.

11. The method of claim 1, further comprising registering at least one of the first application and second application with an app registry of the content management system.

12. A non-transitory computer readable medium having stored thereon a sequence of instructions which, when stored in memory and executed by one or more processors causes the one or more processors to perform a set of acts for workflow selection, the set of acts comprising:
establishing one or more network communication links between a content management system that manages a plurality of shared content objects, a first application of a first type, and a second application of a second type that are registered with the content management system;
recording a set of interaction events that correspond to interactions that modify contents into modified contents of at least one shared content object of the plurality of shared content objects, the interactions performed at the first application invoked by a plurality of user computing devices for collaboration on the at least one content object;
constructing a training dataset with first training data pertaining to a plurality of event attributes, second training data pertaining to a plurality of content object attributes, and third training data pertaining to one or more workflows of a plurality of workflows;
training at least one learning model with the training dataset that comprises the first training data pertaining to the plurality of event attributes and the second training data pertaining to the one or more workflows;
in response to the interactions performed at the first application, selecting, from the plurality of workflows, at least one workflow that corresponds to the second application based at least in part on an event attribute associated with the set of interaction events, wherein the at least one learning model facilitates at least one of selecting the at least one workflow, or forming one or more responses from execution of the at least one workflow; and
executing the at least one workflow that facilitates the collaboration on the at least one content object by performing a modification on the modified contents of the at least one shared content object, the modification performed by the second application.

13. The non-transitory computer readable medium of claim 12, the set of acts further comprising: wherein the at least one learning model is trained based at least in part on at least one of selecting the at least one workflow, or initiating execution of the at least one workflow.

14. The non-transitory computer readable medium of claim 12, wherein at least one of selecting the at least one workflow, or executing the at least one workflow is performed without human interaction.

15. A system for workflow selection, the system comprising:
a non-transitory storage medium having stored thereon a sequence of instructions; and
one or more processors that execute the sequence of instructions to cause the one or more processors to perform a set of acts, the set of acts comprising,
establishing one or more network communication links between a content management system that manages a plurality of shared content objects, a first application of a first type, and a second application of a second type that are registered with the content management system;
recording a set of interaction events that correspond to interactions that modify contents into modified contents of at least one shared content object of the plurality of shared content objects, the interactions performed at the first application invoked by a plurality of user computing devices for collaboration on the at least one content object;
constructing a training dataset with first training data pertaining to a plurality of event attributes, second training data pertaining to a plurality of content object attributes, and third training data pertaining to one or more workflows of a plurality of workflows;
training at least one learning model with the training dataset that comprises the first training data pertaining to the plurality of event attributes and the second training data pertaining to the one or more workflows;
in response to the interactions performed at the first application, selecting, from the plurality of workflows, at least one workflow that corresponds to the second application based at least in part on an event attribute associated with the set of interaction events, wherein the at least one learning model facilitates at least one of selecting the at least one workflow, or forming one or more responses from execution of the at least one workflow; and
executing the at least one workflow that facilitates the collaboration on the at least one content object by performing a modification on the modified contents of the at least one shared content object, the modification performed by the second application.

16. The system of claim 15, wherein at least one of selecting the at least one workflow, or executing the at least one workflow, is performed without human interaction.

17. The system of claim 15, the set of acts further comprising:
in response to receiving the training dataset as inputs to the at least one learning model, identify a first change to the at least one learning model;
determining one or more parameters pertaining to a mapping between an interaction event and a corresponding workflow of the at least one learning model based at least upon the first change; and
applying one or more selection rules to the at least one learning model based at least in part upon the one or more parameters that have been identified as pertaining to the mapping, wherein at least one learning model facilitates at least one of selecting the at least one workflow, or forming one or more responses from execution of the at least one workflow.

18. The system of claim 17, the set of acts further comprising:
   in response to receiving the training dataset as inputs to the at least one learning model, identifying a second change to the at least one learning model;
   determining one or more conditions of the at least one learning model pertaining to traversal of at least one of the plurality of workflows based at least upon the second change; and
   applying the one or more conditions to one or more characteristics of one or more workflows of the plurality of workflows, wherein
      the at least one learning model is trained based at least in part on at least one of selecting the at least one workflow, or initiating execution of the at least one workflow.

* * * * *